United States Patent
Dick et al.

(10) Patent No.: US 11,358,617 B2
(45) Date of Patent: Jun. 14, 2022

(54) SYSTEMS AND METHODS FOR ANALYZING THERMAL PROPERTIES OF A RAILROAD

(71) Applicant: ENSCO, INC., Springfield, VA (US)

(72) Inventors: Matthew Dick, Charlottesville, VA (US); Zhipeng Liu, Great Falls, VA (US); Samson Yilma, Arlington, VA (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 17/098,135

(22) Filed: Nov. 13, 2020

(65) Prior Publication Data
US 2021/0061322 A1 Mar. 4, 2021

Related U.S. Application Data

(63) Continuation of application No. 16/584,946, filed on Sep. 27, 2019, now Pat. No. 10,864,926.
(Continued)

(51) Int. Cl.
*H04N 7/18* (2006.01)
*B61K 9/08* (2006.01)
(Continued)

(52) U.S. Cl.
CPC ............ *B61K 9/08* (2013.01); *G01N 21/8851* (2013.01); *G01N 25/72* (2013.01); *G01S 19/01* (2013.01);
(Continued)

(58) Field of Classification Search
CPC ...... B61K 9/08; G01N 21/8851; G01N 25/72; G01S 19/01; G06T 2207/10048; G06T 2207/30108
(Continued)

(56) References Cited

U.S. PATENT DOCUMENTS

| 10,847,009 B1 * | 11/2020 | Sulucz ................. G08B 17/125 |
| 2014/0033755 A1 | 2/2014 | Wong |
| 2020/0239049 A1 | 7/2020 | Dick |

FOREIGN PATENT DOCUMENTS

| EP | 3 138 753 A1 | 3/2017 |
| WO | WO 2014/163864 A1 | 10/2014 |

OTHER PUBLICATIONS

Optotherm, "Thermalyze Thermal Image Analysis Software—Graphs and Charts," Web page <http://www.optotherm.com/software-graphs.htm>, May 11, 2015, retrieved from Internet Archive Wayback Machine <https://web.archive.org/web/20151002025403/http:/www.optotherm.com/software-graphs.htm>on Jul. 6, 2020 (2 pages).
(Continued)

*Primary Examiner* — Robert Chevalier
(74) *Attorney, Agent, or Firm* — Nixon Peabody LLP

(57) ABSTRACT

A system for analyzing thermal properties of a railroad includes a thermal imaging device configured to generate thermal image data reproducible as a thermal image of a portion of the railroad, the thermal image data being associated with a location of the portion of the railroad, an electronic display device, a memory device configured to receive and store therein the generated thermal image data; and one or more processors configured to: determine a temperature metric of the portion of the railroad based at least in part on the thermal image data; and cause the electronic display device to display (i) a first graph indicative of the temperature metric of the portion of the railroad and (ii) a second graph indicative of a railroad track geometry metric associated with the location of the portion of the railroad.

20 Claims, 10 Drawing Sheets

Related U.S. Application Data

(60) Provisional application No. 62/739,124, filed on Sep. 28, 2018.

(51) Int. Cl.
  *G01S 19/01* (2010.01)
  *G01N 21/88* (2006.01)
  *G06T 7/00* (2017.01)
  *G01N 25/72* (2006.01)

(52) U.S. Cl.
  CPC .. *G06T 7/0006* (2013.01); *G06T 2207/10048* (2013.01); *G06T 2207/30108* (2013.01)

(58) Field of Classification Search
  USPC ................ 348/129, 125, 128, 130, 135, 143
  See application file for complete search history.

(56) References Cited

OTHER PUBLICATIONS

Mermee Group, "Head Check—Head Check Detection," Web page <http://www.mermecgroup.com/inspect/track-inpsection/64/head-check.php>, retrieved from Internet on Jul. 7, 2020 (2 pages).

Mermec Group, "Track Inspection—V-CUBE," Web page <http://www.mermecgroup.com/inspect/track-inspection/524/track-inspection-v-cube.php>, retrieved from Internet on Jul. 7, 2020 (2 pages).

Mermec Group, "Fishplate/Joint Bar Inspection," Web page <http://www.mermec.group.com/inspect/track-inspection/65/fishplate--joint-bar.php>, retrieved from Internet on Jul. 7, 2020 (2 pages).

Mermec Group, "Internal Rail Flaw—Ultrasonic Inspection," Web page <http://www.mermecgroup.com/inspect/track-inspection/1020/internal-rail-flaw.php>, retrieved from Internet on Jul. 7, 2020 (2 pages).

KLD Labs, "Rail Surface Evaluation," Web page 21 http://www.kldlabs.com/?page_id=63>, 2018, retrieved from Internet on Jul. 7, 2020 (2 pages).

KLD Labs, "Rail Profile Measurement," Web page, <http://www.kldlabs.com/?page_id=64>, 2018, retrieved from Internet on Jul. 7, 2020 (2 pages).

KLD Labs, "Third Rail Monitoring," Web page <http://www.kldlabs.com/?page_id=67>, 2018, retrieved from Internet on Jul. 7, 2020 (2 pages).

KLD Labs, "Rail Grinding Assessment," Web page <http://www.kldlabs.com/?page_id=130>, 2018, retrieved from Internet on Jul. 7, 2020 (2 pages).

International Search Report and Written Opinion in International Application No. PCT/US2018/044212, dated Nov. 19, 2018 (12 pages).

\* cited by examiner

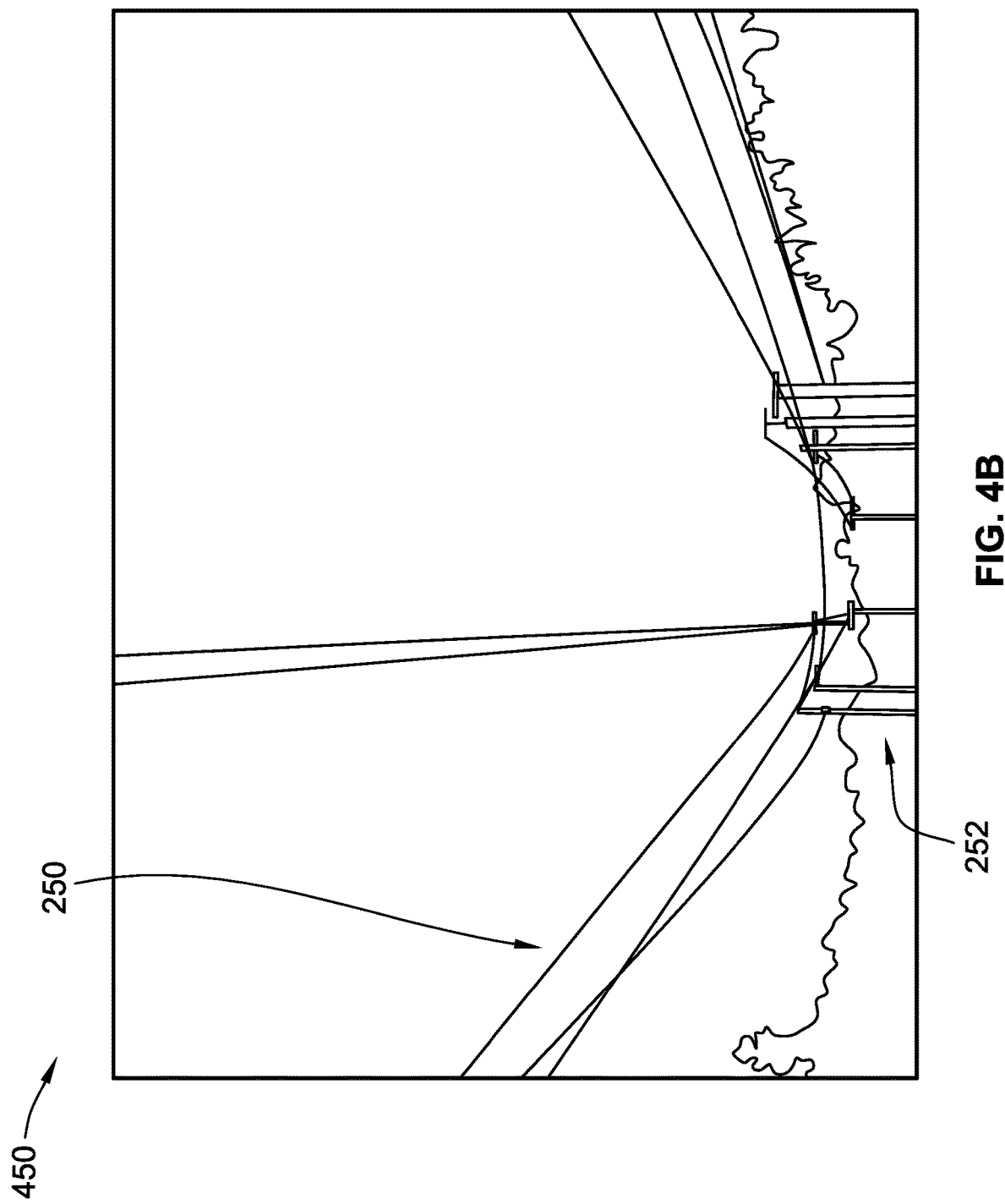

SYSTEMS AND METHODS FOR ANALYZING THERMAL PROPERTIES OF A RAILROAD

CROSS REFERENCE TO RELATED APPLICATIONS

This application is a continuation of U.S. Non-Provisional application Ser. No. 16/584,946, filed Sep. 27, 2019, now allowed, which claims the benefit of and priority to U.S. Provisional Application No. 62/739,124, filed on Sep. 28, 2018, each of which is hereby incorporated by reference herein in its entirety.

TECHNICAL FIELD

The present disclosure relates generally to railroad inspection systems, and more particularly, to systems and methods for analyzing thermal properties of a railroad.

BACKGROUND

Railroads (e.g., subways, elevated trains, high speed rail, monorails, trams, etc.) often develop defects or undesirable conditions over continued use. For example, in the case of railroads with electric railroad vehicles that utilize an electrified rail or overhead power line, undesirable defects or conditions can include overheating, power leakage, and/or electrical arcing from the electrified rail or overhead power line. Another example of an undesirable defect or condition is standing or pooling water due to seepage through a tunnel wall/ceiling (e.g., in a subway tunnel) or poor drainage of the railroad track bed (e.g., an obstructed drain box). These defects or conditions may contribute to other types of railroad defects (e.g., cracks, pitting, misalignment, etc.) or pose a safety hazard (e.g., electrocution, fires, flooding, etc.). Railroads can be inspected manually by a human, or by using an inspection system located on a transport device (e.g., a railcar, a railroad vehicle, etc.) to identify the presence or absence of defects or conditions. However, these inspection systems are often unable to identify certain defects or conditions, such as, for example, electrical arcing, overheating, power leakage, or water seepage in a tunnel, because these conditions are transient and/or are not readily visible to the human eye alone (either directly or in images). The present disclosure is directed to solving these and other problems.

SUMMARY

According to some implementations of the present disclosure, a system for analyzing thermal properties of a railroad includes a thermal imaging device configured to generate thermal image data reproducible as a thermal image of a portion of the railroad, the thermal image data being associated with a location of the portion of the railroad, an electronic display device, a memory device configured to receive and store therein the generated thermal image data, and one or more processors configured to: determine a temperature metric of the portion of the railroad based at least in part on the thermal image data and cause the electronic display device to display (i) a first graph indicative of the temperature metric of the portion of the railroad and (ii) a second graph indicative of a railroad track geometry metric associated with the location of the portion of the railroad.

According to some implementations of the present disclosure, a system for analyzing thermal properties of a railroad includes a thermal imaging device configured to generate thermal image data reproducible as a thermal image of a portion of the railroad, a camera configured to generate image data reproducible as an image of the portion of the railroad, a GPS sensor configured to determine a location of the system relative to the portion of the railroad, an electronic display device, a memory device configured to receive and store therein the generated thermal image data and the image data, and one or more processors configured to: determine a temperature metric of the portion of the railroad based at least in part on the thermal image data, identify a defect in the portion of the railroad by comparing the determined temperature of the portion of the railroad to a predetermined threshold value stored in the memory device, and cause (i) the thermal image of the portion of the railroad, (ii) the image of the portion of the railroad, (iii) a numerical value indicative of the determined terminal metric, or any combination of (i), (ii), and (iii) chrto be displayed on the electronic display device responsive to identifying the defect in the portion of the railroad.

According to some implementations of the present disclosure, a method for analyzing thermal properties of a railroad includes generating, using a thermal imaging device, thermal image data reproducible as one or more thermal images of a plurality of sections of the railroad, determining a temperature metric for each of the plurality of sections of the railroad based at least in part on the thermal image data, and displaying, on an electronic display device, one or more graphs indicative of the determined temperature metric for each of the plurality of sections of the railroad.

According to some implementations of the present disclosure, a system for analyzing thermal properties of a railroad includes a thermal imaging device configured to generate thermal image data reproducible as a thermal image of a portion of the railroad, an electronic display device, a memory device configured to receive and store therein the generated thermal image data, and one or more processors configured to analyze the thermal image data to determine a temperature metric of the portion of the railroad and cause the electronic display device to display a graph indicative of the temperature metric of the portion of the railroad.

According to some implementations of the present disclosure, a system for analyzing thermal properties of a railroad includes a thermal imaging device configured to generate thermal image data reproducible as a thermal image of a portion of the railroad, a communication module, a memory device configured to receive and store therein the generated thermal image data, and one or more processors configured to: analyze the thermal image data to determine a temperature metric of the portion of the railroad and cause the communication module to transmit a graph indicative of the temperature metric of the portion of the railroad to a remote device.

According to some implementations of the present disclosure, a system for visualizing and analyzing thermal properties of a railroad includes a transport device configured to move along the railroad, a thermal imaging device coupled to the transport device and being configured to generate thermal image data reproducible as a thermal image of a portion of the railroad, an electronic display device, a GPS module coupled to the transport device for determining a location of the transport device, a communication module coupled to the transport device, a memory device configured to receive and store therein the generated thermal image data, and one or more processors configured to analyze the thermal image data to determine a temperature metric of the portion of the railroad, and cause (i) the electronic display device to display a graph indicative of the temperature metric of the portion of the railroad, (ii) the communication module to transmit a graph indicative of the temperature metric of the portion of the railroad to a remote device, or (iii) both (i) and (ii).

According to some implementations of the present disclosure, a method for analyzing thermal properties of a railroad includes obtaining, using a thermal imaging device, (i) first thermal image data reproducible as a first thermal image of a first portion of the railroad and (ii) second thermal image data reproducible as a second thermal image of a second portion of the railroad, analyzing the first thermal image data to determine a temperature metric of the first section of the railroad, analyzing the second thermal image data to determine a temperature metric of the second section of the railroad, and generating a graph indicative of the determined temperature metric of the first section and the second section of the railroad.

According to some implementations of the present disclosure, a method for analyzing thermal properties of a railroad includes obtaining, using a thermal imaging device, first thermal image data reproducible as one or more thermal images of a plurality of sections of the railroad, analyzing the thermal image data to determine a temperature metric in the thermal image of each of the plurality of sections of the railroad, and displaying a graph indicative of the determined temperature metric for each of the plurality of sections of the railroad.

According to some implementations of the present disclosure, a method for analyzing thermal properties of a railroad includes obtaining, using a thermal imaging device, thermal image data reproducible as one or more thermal images along a length of the railroad, analyzing the thermal image data to determine a temperature metric along the length of the railroad, comparing the determined the temperature metric along the length of the railroad to a predefined temperature threshold indicative of a railroad condition, responsive to the determined temperature metric at a location along the length of the railroad being less than the predefined temperature threshold, analyzing one or more railroad track geometry metrics associated with the location along the length of the railroad to identify the presence or absence of a railroad track defect, and responsive to identifying the presence of a railroad track defect at the location, generating a report identifying the railroad condition at the location as the cause of the railroad track defect at the location.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 4B is a visual image of a portion of the railroad including overhead wires generated by the camera of the system of FIG. 2 according to some implementations of the present disclosure;

Figure 1:
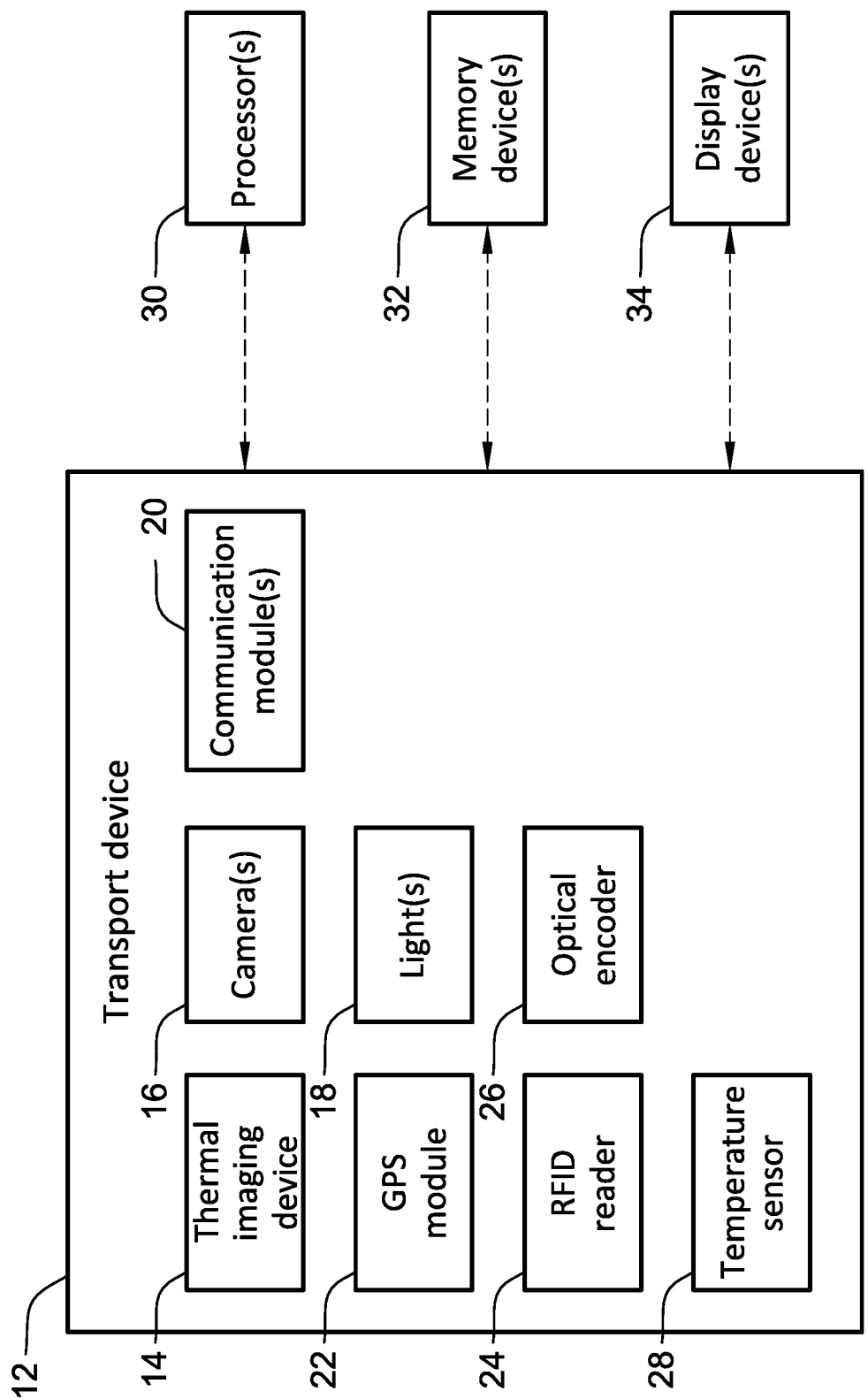
FIG. 1 is a schematic block diagram of a system for analyzing thermal properties of a railroad according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Temperature metrics (e.g., maximum temperature, minimum temperature, average temperature, etc.) of a railroad (which can include a first running rail, a second running rail, a third power rail, a crosstie, a fastener, a joint-bar, ballast, an overhead power line, an overhead support line, an overhead catenary line, a tunnel wall, a tunnel ceiling, a switch, or any combination thereof) can be indicative of one or more conditions of the railroad. For example, in cases where the railroad includes an electrified third power rail (e.g., in a subway) or an overhead power line or an overhead catenary line, high temperatures (e.g., relative to an ambient temperature, greater than predefined temperature threshold, etc.) can be indicative of power leakage, electrical shorting, and/or electrical arcing from the third power rail or overhead power line or overhead catenary line (e.g., arcing between an overhead power line and an overhead support line), which can pose a safety hazard (e.g., electrocution, fires, etc.). For instance, a high temperature on a running rail may be indicative of electrical arcing from the third power rail. For another example, low temperatures (e.g., relative to an ambient temperature, lower than a predefined temperature threshold, etc.) can be indicative of standing or pooling water (e.g., due to leakage or seepage of water in a subway tunnel, poor drainage of the track bed, etc.) on or adjacent to the railroad which can also pose a series of safety hazards (e.g., shorting of electrical equipment). Disclosed herein are systems and methods for determining and analyzing one or more temperature metrics of a railroad and displaying one or more graphs indicative of the determined temperature metrics to aid in identifying one or more defects or conditions on the railroad (e.g., standing/pooling water, seepage in tunnels, electrical arcing, electrical leakage, etc.).

Referring to FIG. 1, a system 10 for analyzing thermal properties of a railroad includes a transport device 12, a thermal imaging device 14, a camera 16, one or more lights 18, a communication module 20, a GPS module 22, a radio frequency identifier (RFID) reader 24, an optical encoder 26, a temperature sensor 28, one or more processors 30, one or more memory devices 32, and a display device 34. Generally, the system 10 is used to analyze the thermal properties of a railroad by obtaining thermal images of a portion of the railroad from the thermal imaging device 14 and generating one or more graphs (FIG. 7) indicative of the one or more determined temperature metrics (e.g., a maximum temperature metric, a minimum temperature metric, an average temperature metric, a temperature standard deviation metric, a temperature spike metric, etc.). The graph(s) indicative of determined temperature metric(s) can be displayed on the display device 34, and in some implementations, are displayed side-by-side with one or more graphs indicative of railroad track geometry metrics.

The transport device 12 is moveable along one or more rails of the railroad. The transport device 12 can be, for example, a locomotive, a railcar, a passenger car, a freight car, a subway train, a railroad vehicle, a road vehicle (e.g., a vehicle configured to operate on both railroad tracks and a conventional surface road), etc. In some implementations, the transport device 12 can move along the railroad without directly contacting the one or more rails. For example, in such implementations, the transport device 12 can be an aerial vehicle (e.g., an unmanned aerial vehicle) configured to travel along one or more rails of the railroad at a predetermined altitude. More generally, the transport device 12 can be any suitable device that is configured to move along one or more rails of the railroad, including, for example, subway tracks, elevated train tracks, high speed rail tracks, monorail tracks, tram tracks, etc. The railroad can include a first running rail, a second running rail, a third power rail, a crosstie, a fastener, a joint-bar, ballast, one or more overhead lines (e.g., overhead power lines, overhead support lines, or both, which often referred to collectively as catenary lines or catenary wires), a tunnel wall, a tunnel ceiling, a rail switch, electrical conduits, electrical cables, electrical components, or any combination thereof.

The thermal imaging device 14 is coupled to the transport device 12 such that a field of view or image plane of the thermal imaging device 14 is aimed at a portion of the railroad. The thermal imaging device 14 is configured to generate thermal image data reproducible as one or more thermal images of the portion of the railroad. The thermal imaging device 14 can be, for example, a thermographic camera configured to detect infrared radiation (e.g., between a wavelength of about 9 micrometers and about 14 micrometers). The amount of infrared radiation emitted from an object or surface increases with temperature, thus, the detected infrared radiation is indicative of a temperature. The thermal imaging device 14 can detect temperatures ranging between, for example, about −50° C. and about 2,000° C., 0° C. to about 1,000° C., 20° C. to about 50° C., etc. In some implementations, a user can select the range of temperatures that are detected by the thermal imaging device 14.

The thermal data obtained by the thermal imaging device 14 is reproducible as one or more thermal images comprising a range of colors, where each color is indicative of a temperature and/or a range of temperatures. For example, in some implementations, violet (which has the lowest wavelength on the visible light spectrum) is indicative of the coldest temperature in the temperature image and red (which has the highest wavelength on the visible light spectrum) is indicative of the hottest temperature within the thermal image. In such implementations, shades of violet, blue, green, yellow, orange, and red are indicative of temperatures therebetween (e.g., 22° C., 24° C., 27° C., 29° C., 31° C., 33° C., 36° C., 38° C., etc). The thermal image can include a temperature range between about 20° C. and about 40° C., between −30° C. and about 55° C., between about −50° C. and about 2,000° C., between about 0° C. to about 1,000° C., between about 10° C. and about 100° C., between about 20° C. to about 50° C., etc. The range of colors in the thermal image can be selected, for example, such that the highest temperature in the image is red and the coldest in the image is violet, or vice versa (e.g., violet is indicative of the highest temperature and red is indicative of the lowest temperature). Alternatively, the colors the thermal image can correspond to a predefined range of temperatures that is selected by a user, rather than being scaled to the detected highest and lowest temperatures within the thermal image (e.g., if the predefined range of temperatures is between about 0° C. and about 100° C., temperatures of 0° C. and lower are represented as violet, temperatures of 100° C. and greater are represented as red, and shades of violet, blue, green, yellow, orange, and red are indicative of temperatures therebetween). Generally, the user can select the range of colors and/or range of temperatures (e.g., the maximum and minimum temperatures) to make temperature differences within the thermal image more distinctive and readily apparent to the human eye.

The camera 16 is coupled to the transport device 12 and is configured to generate visual image data reproducible as one or more visual images of the railroad. To create visual images, the camera 16 captures light within the visible wavelength, e.g., a range of wavelengths between about 400 nanometers and about 700 nanometers. The camera 16 can be a digital camera that generates video images, still images, or both; and can optionally include zooming ability (e.g., optical and/or digital zoom). As described in further detail herein, the thermal imaging device 14 and the camera 16 can be configured such that an image plane and/or field of view of the thermal imaging device 14 is coincident with, or overlaps, at least a portion of an image plane and/or field of view of the camera 16 such that the portion of the railroad in the thermal image obtained by the thermal imaging device 14 is the same as the portion of the railroad in the visual image obtained by the camera 16. Further, the thermal images or portions thereof generated by the thermal imaging device 14 can be overlaid on the visual images generated by the camera 16, or vice versa (i.e., the visual images or portions thereof generated by the camera 16 can be overlaid on the thermal images generated by the thermal imaging device 14).

The one or more lights 18 are coupled to the transport device 12 and are generally used to illuminate the portion of the railroad to aid the camera 16 in generating image data reproducible as one or more visual images of a portion of the railroad. For example, if the transport device 12 traveling through a tunnel (e.g., a subway tunnel), a lack of adequate lighting in the tunnel may negatively affect the quality of the visual images generated by the camera 16. The one or more lights 18 illuminate the portion of the railroad track in front of the transport device 12 (in the direction of travel) to aid in improving the image quality.

The communication module 20 is coupled to the transport device 12 and can be used, for example, to wirelessly transmit thermal image generated by the thermal imaging device 14 and/or visual image data generated by the camera 16 to one or more remote devices or locations (e.g., a device that is not coupled to the transport device 12 such as a computer, a laptop, a server, a smartphone, cloud based storage, etc.) More generally, the communication module 20 can wirelessly transmit any data obtained, determined, or analyzed on the transport device 12 to remote device(s) or location(s) (e.g., transmit a graph that is indicative of a determined temperature metric). The communication module 20 can wirelessly communicate with the remote device using any suitable communication protocol, such as, for example, a radio-frequency communication system, a cellular network, or the like. In some implementations, the communication module 20 is a transceiver that is configured to send data to one or more remote devices or locations and receive data from one or more remote devices or locations.

The GPS sensor 22 (e.g., a GPS module) is coupled to the transport device 12 and is configured to receive GPS signals for determining a location (e.g., latitude and longitude, or other coordinates) of the transport device 12. The current location of the transport device 12 can be expressed in terms of a distance along the railroad. For example, using the GPS sensor 22, it can be determined that the transport device 12 is located at meter 400 of the railroad. Alternatively, the current location of the transport device 12 can be expressed in terms of a distance traveled from an initial position, as determined by the GPS sensor 22.

As described herein, the transport device 12 may travel within a tunnel (e.g., a subway tunnel) or other types of GPS dead zones. In this case, the GPS sensor 22 may be unable to obtain a reliable GPS signal from which the current location of the transport device 12 can be determined accurately. Accordingly, in some implementations, the system 10 includes the RFID reader 24, which is coupled to the transport device 12 and is configured to receive location information from RFID tags positioned on or adjacent to the railroad (e.g., RFID tags coupled to a running rail of the railroad). The RFID tags store information such as, for example, GPS coordinates or a distance relative to one or more landmarks along the railroad (e.g., mileposts, chain markers, signals, stations, or other railroad assets). The location information from the RFID tag is automatically received by the RFID reader 24 when the RFID reader 24 is within a sufficient proximity to the RFID tag (e.g., 3 inches, 6 inches, one foot, three feet, six feet, etc.) The RFID tag can also store and/or be associated with (e.g., via a look up table, etc.) other types of location information, such as, for example, a track number, a switch number, a crossing number, a station number, a signal number, etc.

Like the GPS sensor 22 and the RFID reader 24, the optical encoder 26 is coupled to the transport device 12 and can be used to determine a current location of the transport device 12 along the railroad. More specifically, the optical encoder 26 is coupled to an end of an axel of the transport device 12 and detects rotational position changes and converts the angular position or motion to analog or digital signal outputs. Based on the signal output of the optical encoder 26, a current location the transport device 12 along the railroad can be determined and/or estimated (e.g., using the processor(s) 30). For example, if the transport device 12 begins moving from a predefined initial position, the optical encoder 26 can be used to define a current location of the transport device 12 in terms of a distance traveled from the predefined initial location. For example, if the predefined initial position is a first mile marker, and it is determined based on signals from the optical encoder 26 that the transport device 12 has traveled one mile, it can be determined that the transport device 12 is currently located at the next mile marker. Alternatively, the optical encoder 26 can be used in combination with the GPS sensor 22 and/or the RFID reader 24 to determine a current location of the transport device 12 relative to a previously determined or recorded location (e.g., last known GPS coordinates, location data obtained from an RFID tag, etc.) The optical encoder 26 can also be used to detect whether the transport device 12 is moving or not such that the thermal imaging device 14 and/or the camera 16 can be automatically actuated responsive to movement of the transport device 12, and deactivated responsive to movement of the transport device 12 ceasing.

The temperature sensor 28 is coupled to the transport device 12 and is configured to determine an ambient temperature of the environment surrounding the transport device 12. As described in further detail herein, the ambient temperature determined by the temperature sensor 28 can be used as a temperature threshold and is compared to the determined temperature metrics from the thermal image data obtained by the thermal imaging device 14. Alternatively, in some implementations, the system 10 can receive an ambient temperature that can be used as a temperature threshold from a remote device (e.g., from a local weather report, from a thermometer at a railroad station, etc.) via the communication module 20 based on the current location of the transport device 12 as determined by the GPS sensor 22, RFID reader 24, and/or optical encoder 26. Alternatively still, in some implementations, the ambient temperature of the environment surrounding the transport device 12 can be estimated from the thermal image data obtained by the thermal imaging device 14. For example, the ambient temperature can be determined by analyzing a sequence of thermal images obtained at different times.

The one or more processors 30 are communicatively coupled to the thermal imaging device 14, the camera 16, the light(s) 18, the communication module 20, the GPS sensor 22, the RFID reader 24, the optical encoder 26, and the temperature sensor 28 and are generally used to control the operation of these components. All or some of the one or more processors 30 can be coupled to (e.g., located on or in) the transport device 12, or alternatively, all or some of the processor(s) 30 can be decoupled from the transport device 12 (e.g., located on or in a remote device). The one or more processors 30 can include any suitable number of processors or microprocessors (e.g., one processor, two processors, four processors, ten processors, etc.)

The one or more memory devices 32 are communicatively coupled to the processor(s) 30 and are generally used to store machine readable instructions that are executable by the processor(s) 30. The one or more memory devices 32 can also be used to store thermal image data generated by the thermal imaging device 14, image data generated by the camera 16, location data generated by the GPS sensor 22, RFID reader 24, and/or optical encoder 26, and/or temperature data generated by the temperature sensor 28. Like the processor(s) 30, all or some of the one or more memory devices 32 can be coupled to (e.g., located on or in) the transport device 12, or alternatively, all or some of the memory device(s) 32 can be decoupled from the transport device 12 (e.g., located on or in a remote device). The memory devices 32 can be any suitable computer readable storage device or media such as, for example, a random or serial access memory device, a hard drive, a solid state drive, a flash memory device, etc.

The display device 34 is communicatively coupled to the processor(s) 30 and memory device(s) 32 and can display image(s) (e.g., still, video, or both). For example, the display device 34 can display thermal images generated by the thermal imaging device 14, images generated by the camera 16, or a combination thereof. As described in further detail herein, the display device 34 can display one or more graphs (FIG. 7) that are indicative of one or more temperatures metrics of the railroad and/or one or more graphs that are indicative of one or more railroad track geometry metrics. The display device 34 can be coupled to (e.g., located on) the transport device 12 such that a human user on the transport device 12 can view the displayed image(s) and/or graph(s), or alternatively, the display device 34 can be decoupled from (e.g., not located on) the transport device 12 such that a human user that is not physically located on the transport device 12 can view the displayed image(s) and/or graph(s). In some implementations, the system 10 can include a plurality of display devices 34, such as, for example, a first display device coupled to the transport device 12 (e.g., located on) and a second display device that is not coupled to (e.g., not located on) the transport device 12. The display device 34 can be, for example, a general or special purpose desktop computer, laptop computer, tablet computer, smartphone, display monitor, television, touchscreen, LED display, LCD display, or the like, or any combination thereof.

While the system 10 is shown in FIG. 1 as including all of the components described herein, more or fewer components can be included in a system. For example, an alternative system (not shown) includes the thermal imaging device 14, the communication module 20, the GPS sensor 22, the processor(s) 30, the memory device(s) 32 and the display device 34. As another example, an alternative system (not shown) includes the transport device 12, the thermal imaging device 14, the camera 16, the communication module 20, the GPS sensor 22, the temperature sensor 28, the processor(s) 30, the memory device(s) 32 and the display device 34. As yet another example, an alternative system (not shown) includes the thermal imaging device 14, the processor(s) 30, and the memory device(s) 32. Thus, various systems for determining and/or analyzing temperature metrics of a railroad can be formed using any portion of the components described herein.

Figure 2:
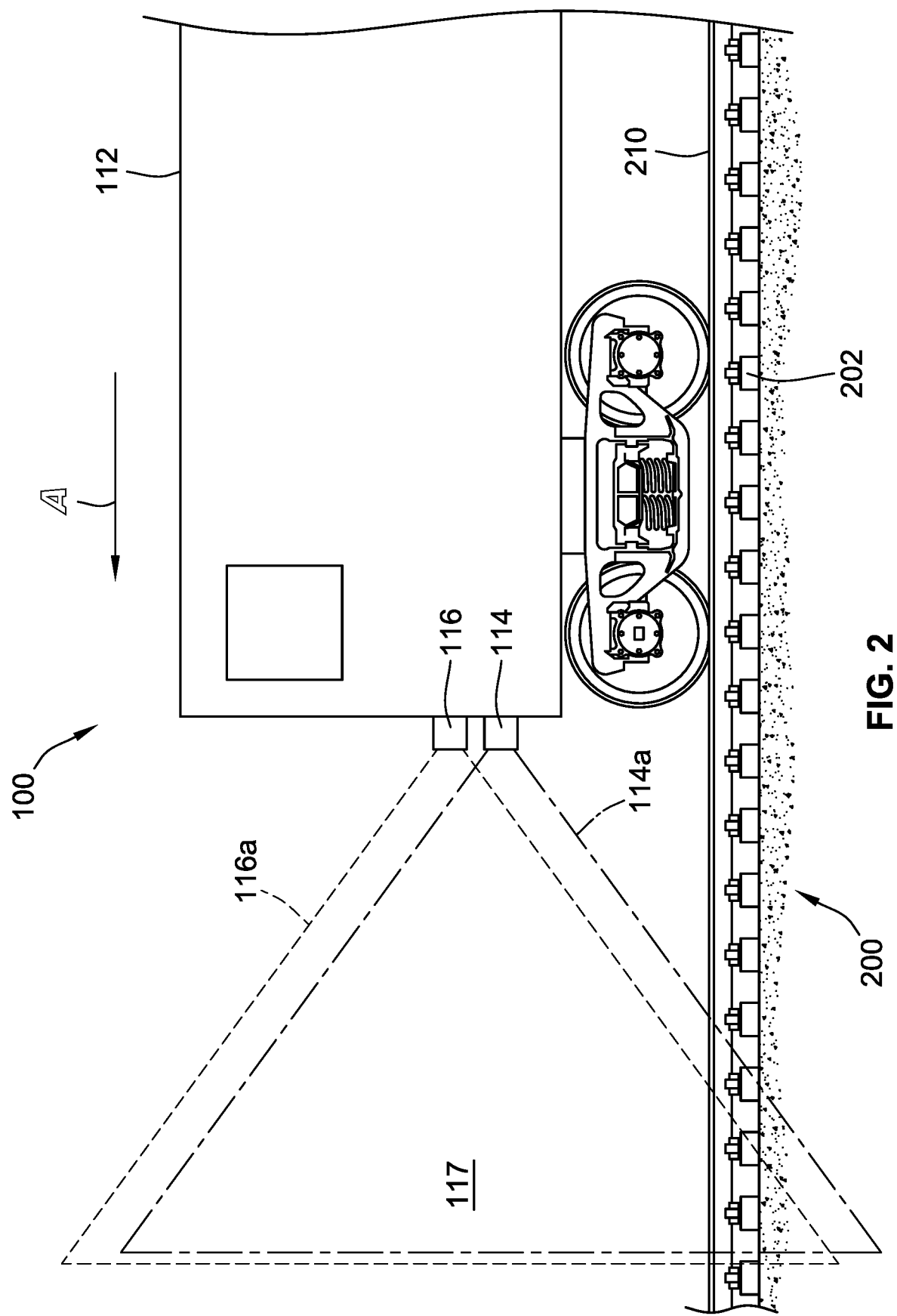
FIG. 2 is a side view of a system for analyzing thermal properties of a railroad according to some implementations of the present disclosure.

Referring generally to FIGS. 2-4, a system 100 for analyzing and/or determining temperature metrics of a railroad 200 is illustrated. The system 100 includes a transport device 112 (FIG. 2) that is the same as, or similar to, the transport device 12 (FIG. 1) that is configured to travel along a first running rail 210 (FIG. 2) and a second running rail 220 (FIGS. 3 and 4) of the railroad 200.

Movement of the transport device 112 (e.g., in the direction of arrow A shown in FIG. 2) is powered by a third power rail 230 (FIGS. 3 and 4) of the railroad 200. The third power rail 230 is an electrified conductor positioned adjacent to the second running rail 220 that delivers electric power (e.g., a direct current having a voltage between about 500 Volts to about 1500 Volts) to the transport device 112. The transport device 112 includes one or more sliding shoe contacts (not shown) adjacent to the wheels that contact an upper surface of the third power rail 230, an inner side surface of the third power rail 230, and/or a lower surface of the third power rail 230 to create an electrical connection between the third power rail 230 and the transport device 112.

While the third power rail 230 is shown in FIGS. 3 and 4 as being adjacent to the second running rail 220 of the railroad 200, in other implementations, the third power rail 230 can be positioned between the first running rail 210 and the second running rail 220, or adjacent to the first running rail 210. And while the railroad 200 is shown as including three rails (first running rail 210, second running rail 220, and third power rail 230), the railroad 200 more generally can include any suitable number of rails (e.g., a pair of running rails, a pair of running rails and a pair of power rails, a pair of running rails, a power rail, and a return current rail, etc.)

In some implementations, instead of the third power rail 230, the railroad 200 includes one or more overhead power lines, one or more overhead support lines, and/or one or more catenary lines (not shown). In such implementations, the overhead power line or overhead catenary line is similar to the third power rail 230 in that the overhead power line or catenary line delivers electric power to the transport device 12. However, instead of the one or more sliding shoes, the transport device 112 includes a pantograph (not shown) mounted to the top of the transport device 112. The pantograph can include one or more springs that bias a contact shoe up towards the overhead power line to create an electrical connection between the transport device 112 and the overhead power line or overhead catenary line.

As shown in FIGS. 3 and 4, the railroad 200 includes a tunnel 240 that is sized and shaped such that at least the transport device 112 can travel therethrough. The first running rail 210, the second running rail 220, and the third power rail 230 are coupled to a ground of the tunnel 240, which also includes walls 244 and a ceiling 246. The tunnel 240 can be an underground tunnel (e.g., running below a body of water) or an aboveground tunnel (e.g., running through a mountain or other terrain or obstacles). The tunnel 240 also includes a light 248 (e.g., railroad signal light) coupled to the wall 244 that provides signals for the operator of the transport device 112 and/or illuminates the tunnel for the operator of the transport device 112 and/or maintenance crews.

Referring back to FIG. 2, the system 100 includes a thermal imaging device 114 that is the same as, or similar to, the thermal imaging device 114 (FIG. 1) described herein that is coupled to a front or leading end of the transport device 112 relative to the direction of travel (as defined by arrow A). The thermal imaging device 114 is coupled to the transport device 112 such that a field of view 114*a* of the thermal imaging device 114 is aimed at a portion of the railroad 200. Like the thermal imaging device 114 described herein, the thermal imaging device 114 is configured to generate thermal image data reproducible as one or more thermal images of a portion of the railroad 200.

While the thermal imaging device 114 is shown and described as being coupled to a front or leading end of the transport device 112, in some implementations, the thermal imaging device 114 can be coupled to an underside of the transport device 112, an upper surface of the transport device 112, or a rear end of the transport device 112 relative to the direction of travel (as defined by arrow A). Further, in other implementations, a plurality of thermal imaging devices that are the same as, or similar to, the thermal imaging device 114 can be coupled to the transport device 112 at multiple locations (e.g., a first thermal imaging device is coupled to the front end and a second thermal imaging device is coupled to rear end).

Figure 3A:
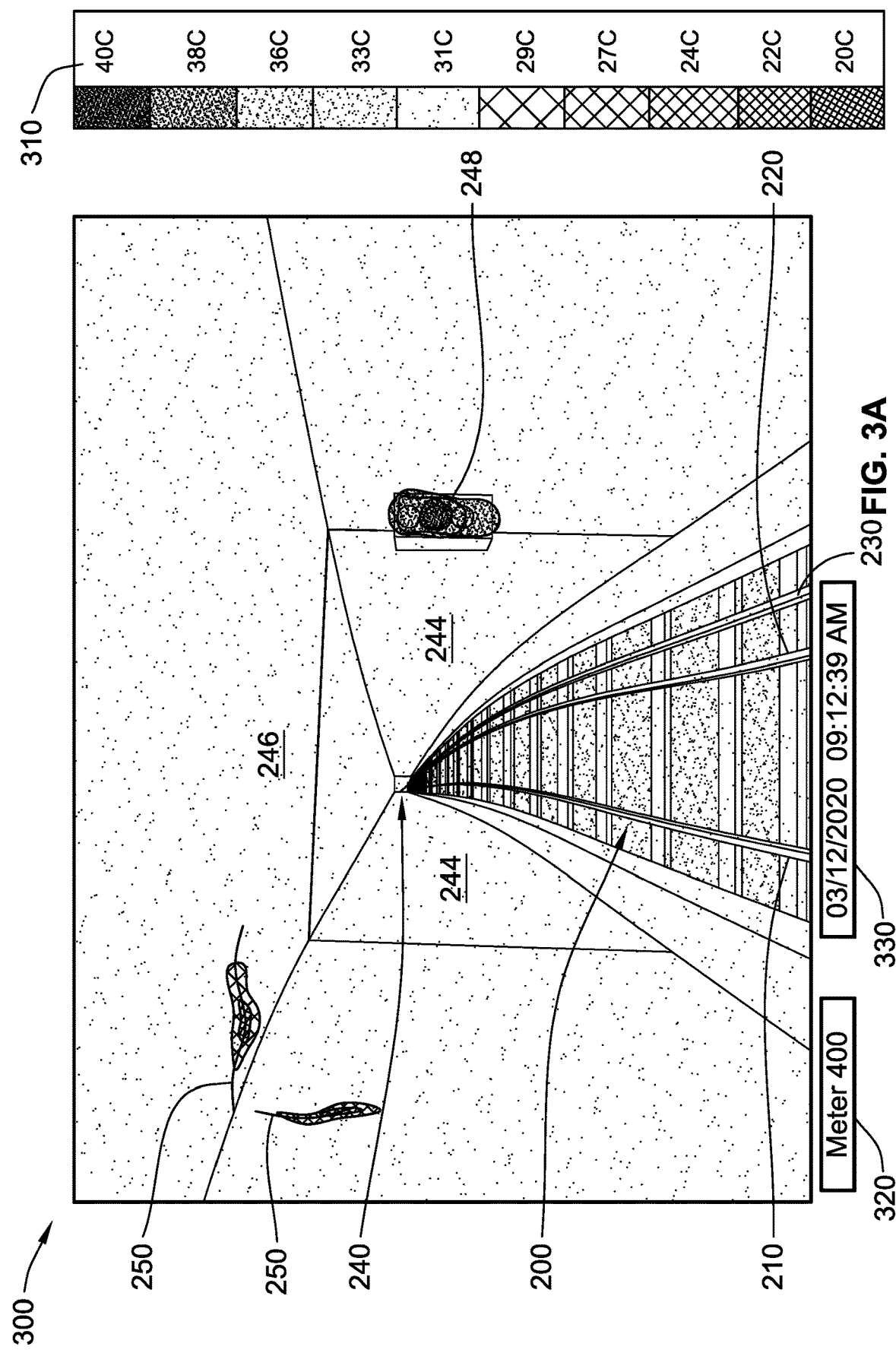
FIG. 3A is a thermal image of a portion of the railroad including a tunnel generated by a thermal imaging device of the system of FIG. 2 according to some implementations of the present disclosure.

Referring to FIG. 3A, a thermal image 300 generated by the thermal imaging device 114 is illustrated. As shown, the thermal image 300 depicts a portion of the railroad 200, including a portion of the first running rail 210, a portion of the second running rail 220, a portion of the third power rail 230, and portions the tunnel 240. The thermal image 300 includes a temperature 310 that ranges between 20° C. and 40° C., where various textures are indicative of 20° C., 22° C., 24° C., 27° C., 29° C., 31° C., 33° C., 36° C., 38° C., and 40° C. The thermal image 300 is the same as, or similar to, thermal image of Appendix A, which is illustrated in color. The thermal image 300 also includes a location stamp 320 indicating a location of the portion of the railroad 200 where the thermal image 300 was captured and a date/time stamp 330 indicating a date and/or time when the thermal image 300 was captured.

The thermal image 300 can be displayed on display device of the system 100 (not shown) that is the same as, or similar to, the display device 34 (FIG. 1) described herein. Like the display device 34, the display device of the system 100 can be coupled to (e.g., located on) the transport device 112, or alternatively, the display device of the system 100 can be decoupled from (e.g., not located on) the transport device 112. Additionally or alternatively, thermal image data reproducible as the thermal image 300 can be transmitted to a remote device via a communication module (not shown) of the system 100 that is the same as, or similar to, the communication module 20 (FIG. 1) described herein.

Figure 3B:
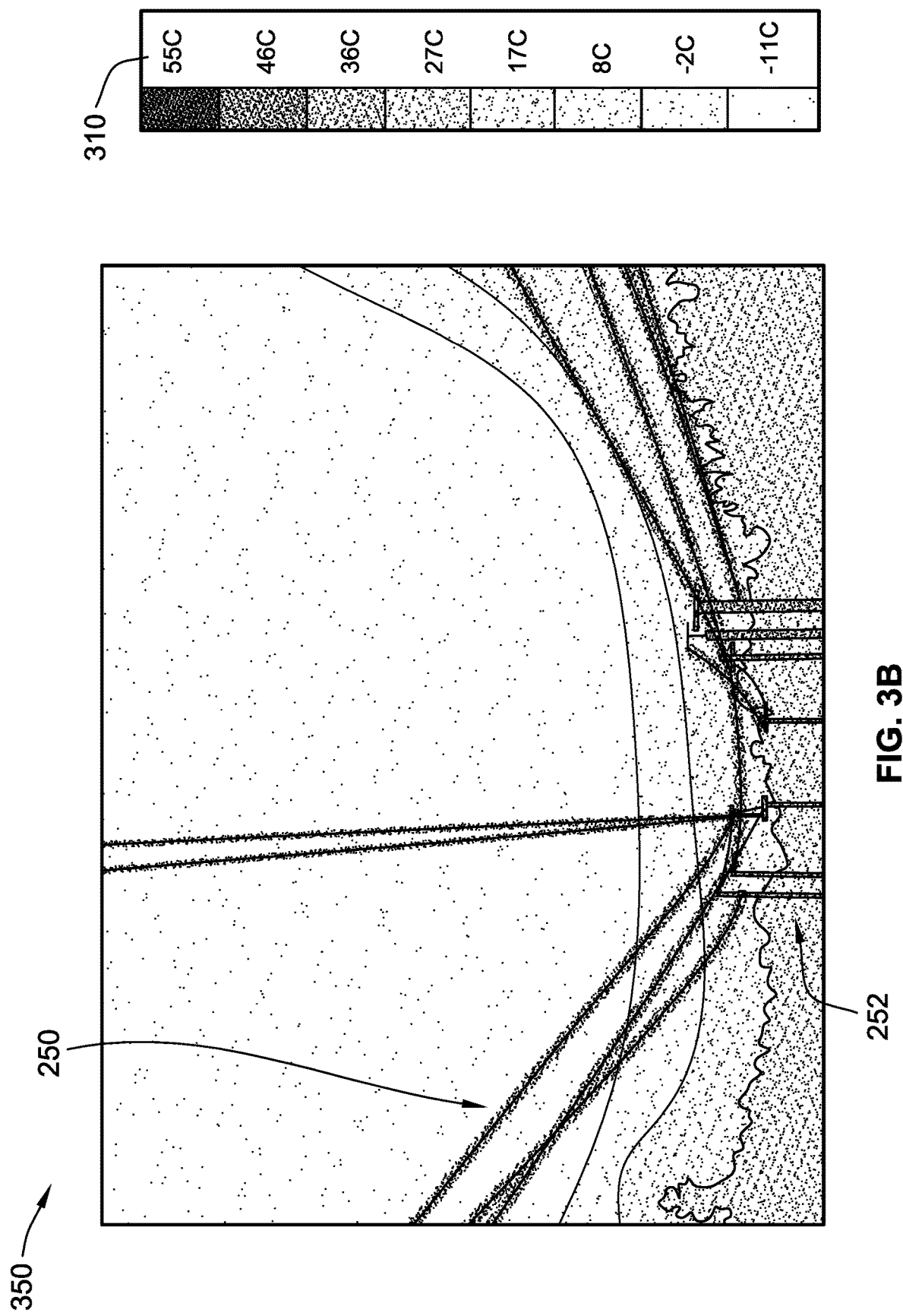
FIG. 3B is a thermal image of a portion of the railroad including overhead wires generated by the thermal imaging device of the system of FIG. 2 according to some implementations of the present disclosure.

Referring to FIG. 3B, a thermal image 350 that is similar to the thermal image 300 (FIG. 3A) generated by the thermal imaging device 114 is illustrated. As described herein, in some implementations, the thermal imaging device 114 can be coupled (e.g., mounted) to an upper surface of the transport device 112 such that overhead lines (e.g., power lines, support lines, or both) of the railroad are within the field of view of the thermal imaging device 114. As shown, the thermal image 350 including a portion of a plurality of overhead catenary lines 250 and a plurality of support structures 252 of the railroad 200. The plurality of overhead catenary lines 250 are similar to the third power rail 230 (FIG. 3A) in that the plurality of overhead catenary lines 250 are electrified and deliver power to the transport device 112 (e.g., via a pantograph coupled to the transport device 112).

Referring to FIG. 2, the system 100 includes a camera 116 that is the same as, or similar to, the camera 16 (FIG. 1) described herein that is coupled to the front or leading end of the transport device 112 relative to the direction of travel (as defined by arrow A). The camera 116 is coupled to the transport device 112 such that a field of view 116a of the camera 116 is aimed a portion of the railroad 200. Like the camera 116 described herein, the thermal imaging device 114 is configured to generate visual image data reproducible as one or more visual images (e.g., still images, video images, or both) of the portion of the railroad 200.

While the camera 116 is shown and described as being coupled to the front or leading end of the transport device 112, in some implementations, the camera 116 can be coupled to an underside of the transport device 112, an upper surface of the transport device 112, or a rear end of the transport device 112 relative to the direction of travel (as defined by arrow A). In other implementations, a plurality of cameras that are the same as, or similar to, the camera 116 can be coupled to the transport device 112 at multiple locations (e.g., a first camera is coupled to the front end and a second camera is coupled to rear end). And while the thermal imaging device 114 and the camera 116 are both shown and described herein as being coupled to the front or leading end of the transport device 112, in some implementations, the thermal imaging device 114 and the camera 116 (or a plurality of thermal imaging devices and/or cameras) can be located on different portions of the transport device 112 (e.g., the thermal imaging device 114 is mounted to the front or leading end of the transport device 112 and the camera 116 is mounted to the underside of the transport device 112).

Figure 4A:
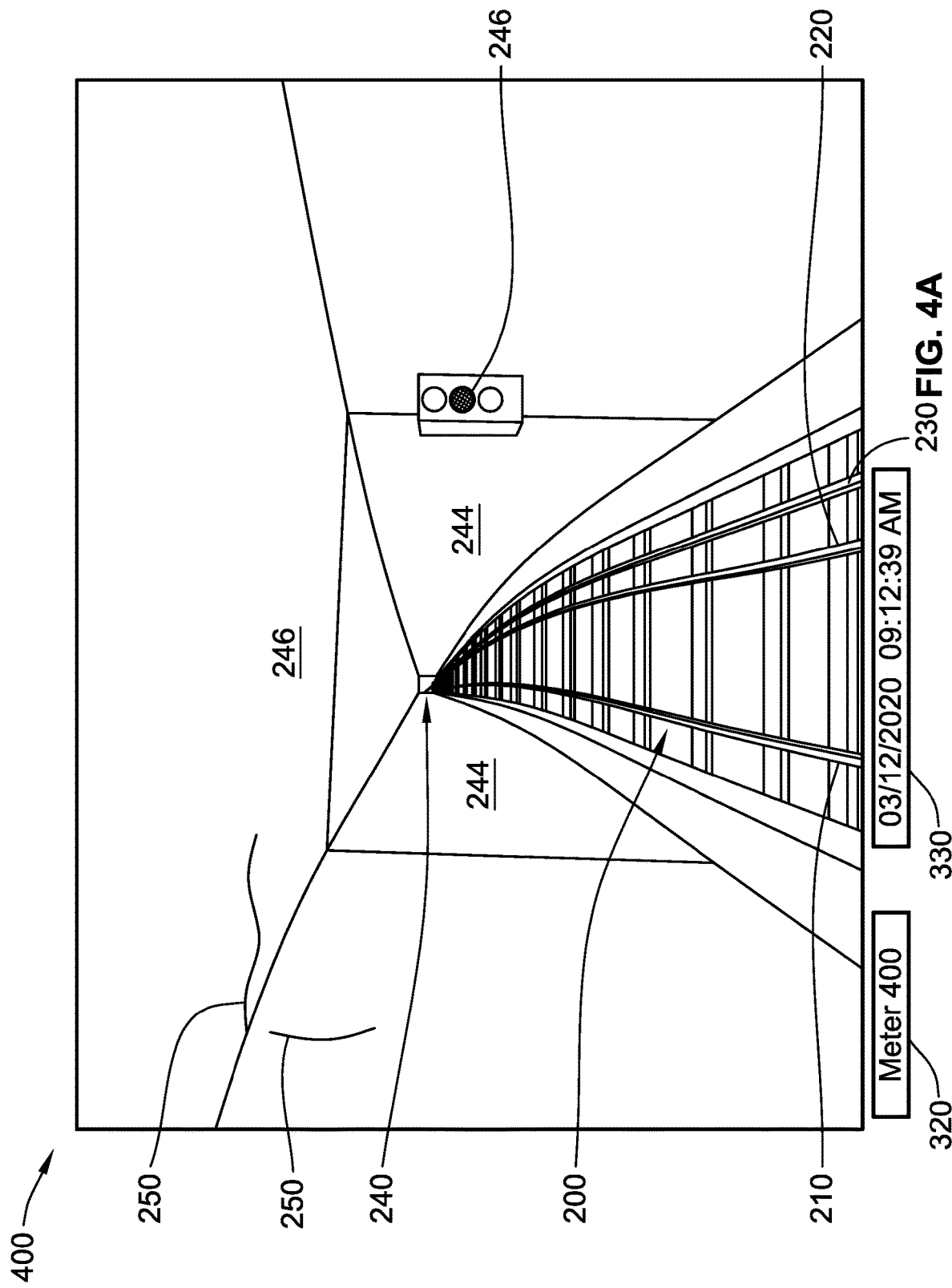
FIG. 4A is a visual image of a portion of the railroad including a tunnel generated by a camera of the system of FIG. 2 according to some implementations of the present disclosure.

Referring to FIG. 4A, a visual image 400 of a portion of the railroad 200 generated by the camera 116 is illustrated. The visual image 400 depicts a portion of the railroad 200, including a portion of the first running rail 210, a portion of the second running rail 220, a portion of the third power rail 230, and portions of the walls 244 and ceiling 246 of the tunnel 240. As shown through a comparison of FIG. 3A and FIG. 4A, the portion of the railroad 200 in the thermal image 300 (FIG. 3A) is substantially the same as the portion of the railroad 200 in the visual image 400 (FIG. 4A).

As described above, the field of view 114a of the thermal imaging device 114 and the field of view 116a of the camera 116 are both aimed at the railroad 200. As shown, the field view of field 114a of the thermal imaging device 114 is not the same as the entire field of view 116a of the camera 116. This is because the thermal imaging device 114 is mounted at a different location (albeit, for example, directly adjacent to) the camera 116. As shown, the field of view 114a and the field of view 116a overlap at area 117. For the thermal image 300 (FIG. 3A) generated by the thermal imaging device 114 to include the same portion of the railroad as the visual image 400 (FIG. 4A) generated by the camera 116, the thermal imaging device 114 and/or camera 116 can be calibrated such that the image(s) generated by either the thermal imaging device 114 and camera 116 only include the overlap area 117 such that the thermal image (e.g., thermal image 300) contains the same feature(s) of the railroad 200 as the image (e.g., visual image 400).

Alternatively, rather than calibrating the thermal imaging device 114 and the thermal imaging device 116, the thermal image 300 and/or image 400 can be edited post-capture such that thermal image 300 and the visual image 400 contain the same portion of the railroad. For example, the system 10 can analyze the thermal image 300 and the visual image 400 to determine a path of the first running rail 210, the second running rail 220, the third power rail 230, or a combination thereof. Based at least in part on the identified path of the rail(s) in the thermal image 300 and the visual image 400 and or based at least in part on known relative locations of the thermal imaging device and the camera 116, the thermal image 300 and/or the visual image 400 can be edited (e.g., cropped, resized, moved, etc.) such that the path of the rail(s) in the thermal image 300 and the path of the rail(s) in the visual image 400 correspond to one another (e.g., they are in the same position in both images).

Referring to FIG. 4B, a visual image 450 that is similar to the visual image 400 (FIG. 4A) generated by the camera 116 is illustrated. As described herein, in some implementations, the camera 116 can be coupled (e.g., mounted) to an upper surface of the transport device 112 such that overhead (catenary) electrical wires of the railroad are within the field of view of the camera 116. As shown, the visual image 450 including a portion of the plurality of overhead catenary lines 250 and the plurality of support structures 252 of the railroad 200. As shown by a comparison of FIGS. 3B and 4B, the field of view of the thermal imaging device 114 is substantially coincident with (e.g., overlaps) the field of view of the camera 116.

Figure 5:
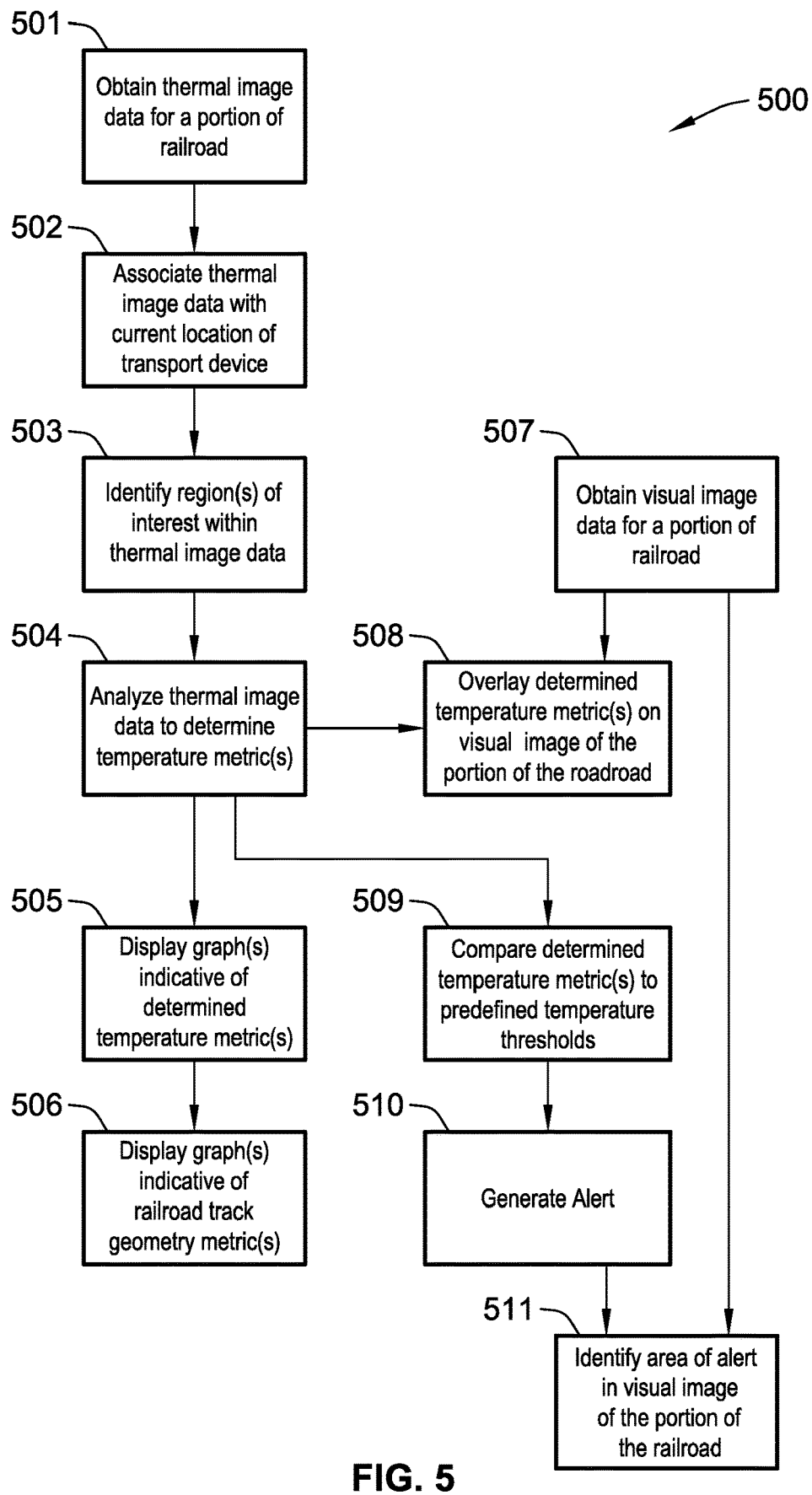
FIG. 5 is a process flow diagram for a method for analyzing thermal properties of a railroad according to some implementations of the present disclosure.

Referring to FIG. 5, a method 500 for analyzing or determining thermal properties of a railroad is illustrated. The method 500 can be used to analyze thermal properties of the railroad 200 (FIGS. 2-4) using the system 100 described herein.

Step 501 of the method 500 includes obtaining, using a thermal imaging device (e.g., thermal imaging device 114 coupled to transport device 112), thermal image data reproducible as a thermal image of a portion of the railroad (e.g., the thermal image shown in FIG. 3A). As described herein, the portion of the railroad in the thermal image can include, for example, a portion of the first running rail 210, a portion of the second running rail 220, a portion of the third power rail 230, and portions of the walls 244 and ceiling 246 of the tunnel 240.

Step 502 of the method 500 includes associating the thermal image data obtained during step 501 with a current location of the transport device such that the thermal image data is associated with the location of the railroad where the thermal image data was obtained. As described herein, the transport device 112 (FIG. 2) can include a GPS sensor that is the same as, or similar to, the GPS sensor 22 (FIG. 1) that is configured to determine the current location of the transport device 112 along the railroad 200 (e.g., in terms of GPS coordinates, distance, etc.). Additionally or alternatively, as described herein, the transport device 112 can further include an RFID reader that is the same as, or similar to, the RFID reader 24 (FIG. 1), and/or an optical encoder that is the same as, or similar to, the optical encoder 26 (FIG. 1) which can be used to determine or estimate a current location of the transport device 112. Associating the thermal image data with the current location of the transport device along the railroad allows the temperature metrics determined from the thermal image data (during step 504) to be compared to other types of data associated with that location on the railroad (e.g., railroad track geometry metrics, as described herein in reference to step 506) and the determined temperature metrics for other locations along the railroad.

Figure 6:
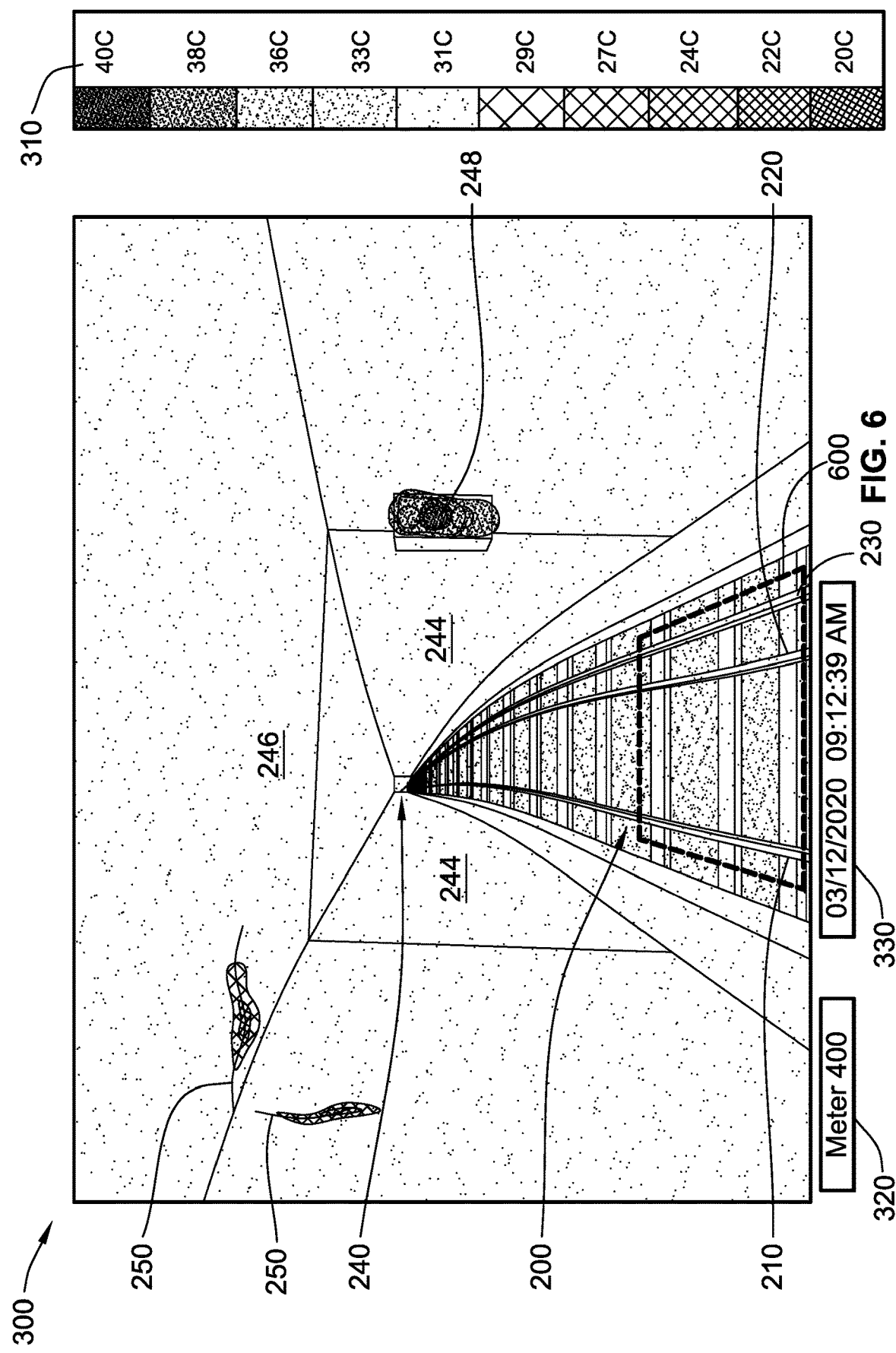
FIG. 6 is a thermal image of a portion of a railroad including an identified region of interest according to some implementations of the present disclosure.

Optional step 503 of the method 500 includes identifying a region of interest within the thermal image of the portion of the railroad. For example, referring to FIG. 6, a region of interest 600 can be identified within the thermal image 300 (FIG. 3A). As shown, the region of interest 600 includes a portion of the first running rail 210, a portion of the second running rail 220, and a portion of the third power rail 230. In this example, the region of interest 600 excludes the walls 244, ceiling 246, and the light 248 of the tunnel 240. As shown by scale 310 in the thermal image 300, the light 248 has a higher temperature that the portion of the first running rail 210, the portion of the second running rail 220, and the portion of the third power rail 230 within the identified region of interest 600. However, the light 248 of the tunnel 240 may not be of interest when determining one or more temperature metrics of the railroad 200 during step 503. Thus, advantageously, by identifying the region of interest 600 to the exclusion of other portions of the thermal image 300, the temperature readings from the light 248 are excluded from the analyzing step 503, and the temperature of the light 248 does not skew the determined temperature metrics (step 504) and graph(s) (step 505), or generate a false alert (step 510).

In some implementations, region of interest 600 can be identified within the thermal image 300 manually by a human user. In other words, step 503 includes displaying the thermal image on a display device (e.g., display device 34 of FIG. 1) to a human user who manually selects the region of interest 600 (e.g., by placing or drawing a line or a box over the desired region of interest). Alternatively, the region of interest 600 can be automatically identified within the thermal image 300 using the one or more processors of the system 100. For example, the processor(s) can analyze the thermal image 300 to identify a path of the first running rail 210, the second running rail 220, the third power rail 230, or a combination thereof. Once the path of the rail(s) are identified, the region of interest 600 can be identified as a predefined area relative to the path of the rail(s). For example, the region of interest 600 can be defined in terms of a predefined lateral distance from the path of the first running rail 210 and the third power rail 230 (e.g., 6 inches, 12 inches, 18 inches, etc.) and a predefined longitudinal distance along the path of the first running rail 210 and the third power rail 230 (e.g., one foot, three feet, six feet, ten feet, twenty feet, etc.) Alternatively still, in some implementations, instead of identifying the path of the first running rail 210, second running rail 220, and/or third power rail 230 from the thermal image 300, the paths of these rails (or other components of the railroad 200) can be identified in an image that includes the same portion of the railroad 200 as the thermal image 300 (e.g., visual image 400 shown in FIG. 4A). As described in further detail herein, such an image can be obtained during step 507 of the method 500. In such implementations, because the portion of the railroad 200 in the thermal image 300 is the same as the portion of the railroad 200 in the visual image 400, the region of interest 600 can be identified using the visual image 400 (which may show the features of the railroad 200 more clearly) and overlaid on the thermal image 300.

While the region of interest 600 is shown as generally rectangular, more generally, the region of interest 600 can have any suitable size and/or shape, such as, for example, a circular shape, a triangular shape, a polygonal shape, etc. Further, while the thermal image 300 includes a single region of interest 600 in FIG. 6, in some implementations, step 503 can include identifying a plurality of regions of interest within the thermal image 300 (e.g., two regions of interest, three regions of interest, five regions of interest, ten regions of interest, etc.). For example, a first region of interest can include a portion of the first running rail 210, a second region of interest can include a portion of the second running rail 220, and a third region of interest can include a portion of the third power rail 230. In another example, a first region of interest can include a portion of the first running rail 210, second running rail 220, and third power rail 230 and a second region of interest can include a portion of a wall 244 of the tunnel 240 or a portion of the ceiling 246 of the tunnel 240.

Step 504 of the method 500 includes analyzing the thermal image data obtained during step 501 to determine one or more temperature metrics of the portion of the railroad. The analyzing during step 504 can be performed using the one or more processors of the system 100. In implementations of the method 500 including optional step 503, step 504 includes analyzing the identified region(s) of interest (e.g., region of interest 600 shown in FIG. 6) within the thermal image data to determine one or more temperature metrics of the portion of the railroad within the identified region(s) of interest. In other words, in such implementations, the portion of the thermal image outside of the identified region(s) of interest is not analyzed during step 504. Advantageously, this may reduce the required processing time or requirements. The one or more temperature metrics determined from the thermal image data during step 504 can include, a maximum temperature, a minimum temperature, an average temperature, a standard deviation of temperature, a temperature gradient, a range of temperatures, or any combination thereof.

In some implementations, the one or more temperature metrics determined from the thermal image data during 504 can include a temperature spike metric. The temperature spike metric is determined based on a moving temperature average. As described herein, as the transport device 12 moves along the railroad track, the thermal imaging device 14 generates or obtains, continuously or at a predetermined interval (e.g., a time interval or a distance interval), thermal image data reproducible as a series of thermal images of the railroad. To determine the temperature spike metric, the one or more processors determine a moving average temperature based on the thermal image in the vicinity of the current location of the transport device 12. For example, the moving temperature average can be the average temperature of the last N number of thermal images of the railroad (e.g., where N is between 2-100 images). The moving average temperature is determined based on an average temperature of a portion of the railroad track as the transport device 12 moves along the track. The moving average temperature is continuously updated as the transport device 12 moves along the railroad track. For example, if the moving average temperature is determined based on the previous two thermal images (a first thermal image and a second thermal image), once a third thermal image is generated or obtained, the moving average is recalculated using the second thermal image and the third thermal image.

Next, the one or more processors determine a deviation between one or more portions of the current thermal image and the moving average. If any of the determined deviations are greater than, or less than, a predetermined threshold (e.g., at least 10% more than the moving average, at least 30% more than the moving average, at least 50% more than the moving average, at least 100% more than the moving average, at least 10% less than the moving average, at least 30% less than the moving average, at least 50% less than the moving average, at least 100% less than the moving average, etc.), a temperature spike is recorded and/or indicated. The temperature spike can be indicative of the track defects or conditions described herein. Further, the temperature spike can be associated with a specific railroad asset captured in the thermal images. As such, the deviation can indicate that, for example, the temperature of one running rail is spiked compared to the moving average temperature. For example, if a portion of the current thermal image has a temperature that is at least 30% less than the moving average, this temperature spike may be indicative of standing/pooling water. As another example, if a portion of the current thermal image has a temperature that is at least 50% greater than the moving average, this temperature spike may be indicative of electrical arcing. In some implementations, the moving average temperature is or approximates an ambient temperature.

As described herein, the average temperature in a given thermal image can be determined based on the all of the temperatures that are detected within the image and/or within a region of interest in the thermal image. Alternatively, in some implementations, determining the temperature spike metric includes determining the average temperature for one or more thermal images by filtering outlier data. Thus, outlier temperatures in each individual thermal image can be filtered out to improve the accuracy of the determined average temperature for each thermal image and consequently the moving average (e.g., using statistical algorithms, determining a standard deviation, determining a weighted average, etc.). For example, temperatures that are a particular amount above or below (e.g., 10% above or below) the calculated average can be excluded from the average temperature calculation (e.g., in a feedback loop calculation where the average temperature is first calculated using all of the thermal data and recalculated after removing the outliers). For another example, if the moving average is based on five thermal images and one of the five thermal images contained a temperature spike, that thermal image can be excluded from the thermal images that are used to determine the moving average.

Each of the temperature metrics determined during step 504 are associated with the location along the railroad where the thermal image data was captured (step 502). Thus, steps 501-504 of the method 500 can be repeated one or more times such that the system determines one or more temperature metrics for a plurality of locations along the railroad track. Steps 501-504 can be repeated continuously as the transport device moves along the railroad such that one or more temperature metrics are continuously determined for every location along the railroad. Alternatively, steps 501-504 can be repeated one or more times at a predefined interval defined by a time period (e.g., every 1 second, every 3 seconds, every 10 seconds, every 30 seconds, etc.) or a distance (e.g., every one inch, every 6 inches, every foot, every three feet, every ten feet, every twenty feet, every fifty feet, etc.).

Figure 7:
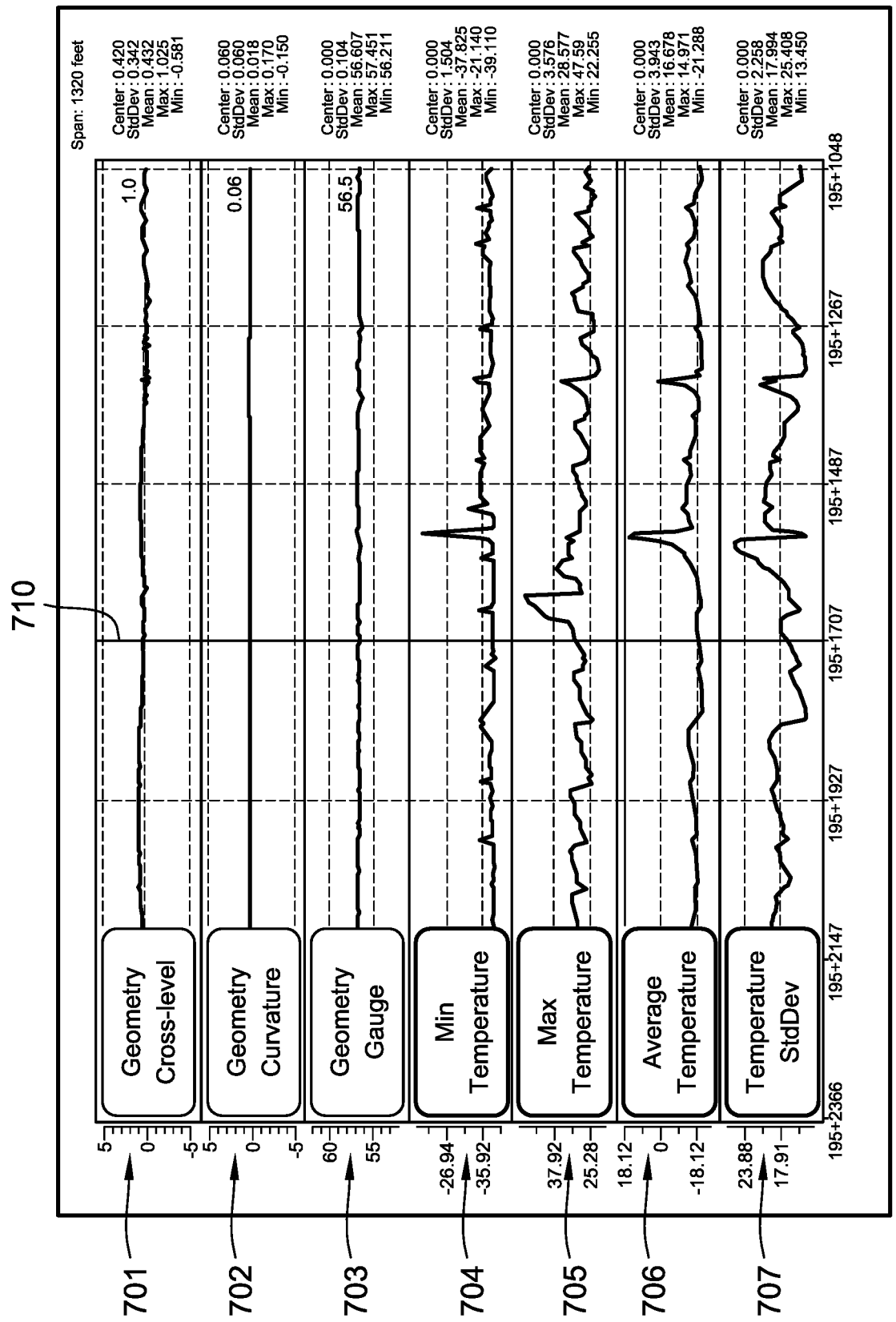
FIG. 7 illustrates a plurality of graphs indicative of temperature metrics and a plurality of graphs indicative of railroad track geometry metrics according to some implementations of the present disclosure.

Step 505 of the method 500 includes displaying one or more graphs indicative of the temperature metric(s) determined during step 504. Referring to FIG. 7, a series of exemplary graphs 704-707 that are each associated with a determined temperature metric of the railroad are illustrated. More specifically, the y-axis of each graph corresponds to the determined temperature metric (step 504) and the x-axis corresponds to the location of the railroad where the determined temperature metric was obtained (step 502). Graph 704 is indicative of a minimum temperature metric at a plurality of locations along a length of the railroad. Graph 705 is indicative of a maximum temperature metric at a plurality of locations along the length of the railroad. Graph 706 is indicative of an average temperature metric at a plurality of locations along the length of the railroad. Graph 707 is indicative of a temperature standard deviation metric at a plurality of locations along the length of the railroad. While four graphs 704-707 are shown in FIG. 7 as being displayed, more generally, any combination of graphs 704-707 or additional graphs can be displayed during step 505. For example, in some implementations, only graphs 704 and 705 are displayed. The graphs 704-707 can be displayed simultaneously or sequentially during step 505.

The one or more graphs include a visual marker 710 that is overlaid on some or all of the graphs 704-707 at a point along the x-axis corresponding to a location along the length of the railroad (e.g., a location of interest). A user can interact with the visual marker to move it to different locations along the railroad and identify the temperature metric(s) associated with that specific location.

In some implementations, responsive to placing the visual marker 710 at a location on the x-axis, step 505 further includes displaying the thermal image (e.g., thermal image 300 of FIG. 3A) obtained by the thermal imaging device and/or the image (e.g., visual image 400 of FIG. 4A) obtained by the camera alongside, or instead of, the graphs 704-707. In implementations including the optional step 503, the identified region of interest can be displayed at the exclusion of other portions of the thermal and/or visual image. This allows a user to visually inspect the thermal image and/or image associated with the location of the visual marker 710. For example, if the user determines based on graph 704 that there is a location along the railroad where the minimum temperature is lower compared to other areas, the user can view the thermal image and/or visual image to determine whether, for example, there is standing or pooling water that is causing the temperature drop.

In some implementations, a second visual marker (not shown) is overlaid on the thermal image and/or image associated with the location of the visual marker 710. The user can move the second visual marker along the length of the rail(s) in the image(s), and movement of the second visual marker causes a corresponding movement of the visual marker 710 (e.g., updating the location of the visual marker 710 along the x-axis of the graph(s) such that the position of the vertical visual marker 710 corresponds to where the second visual marker is positioned on the image (s)).

Step 506 of the method 500 includes displaying one or more graphs indicative of railroad track geometry metric(s). The railroad track geometry metrics can include, for example, a rail cross-level, a rail curvature, a rail gauge, a rail cant, or any combination thereof. Rail cross-level refers to an elevation difference between the head of a first rail (e.g., first running rail 210) and the head of a second rail (e.g., second running rail 220). Rail curvature is determined by forming a reference chord that connects two points along a curve two rails. Two radii are formed between the center of the curve of the two rails, and the respective endpoints of the reference chord. The angle (expressed as degrees or radians) between the two radii is defined as the curvature of the two rails (e.g., the first running rail 210 and the second running rail 220). Rail gauge refers to a horizontal or lateral distance between an inner edge of a first rail (e.g., first running rail 210) and an inner edge of a second rail (e.g., second running rail 220). Rail cant refers to the angle (expressed as degrees or radians) that a running rail (e.g., the first running rail 210 or the second running rail 220) is tilted relative to a horizontal plane (e.g., the ground). Each of the railroad track geometry metrics can be determined using a separate railroad inspection system coupled to the same transport device as the thermal imaging device, or a different transport device.

Referring to FIG. 7, graphs 701-703 indicative of railroad track geometry metrics for a plurality of locations along a length of the railroad are illustrated. Graph 701 is indicative of a rail geometry cross-level metric at a plurality of locations along the length of the railroad. Graph 702 is indicative of a rail geometry curvature metric at a plurality of locations along the length of the railroad. Graph 703 is indicative of a rail geometry gauge metric at a plurality of locations along the length of the railroad. While three graphs 701-704 that are indicative of rail geometry metrics are shown in FIG. 7 as being displayed, more generally, more or less (e.g., one, two, four, six, ten, etc.) graphs indicative of rail geometry metrics can be displayed.

Figure 8:
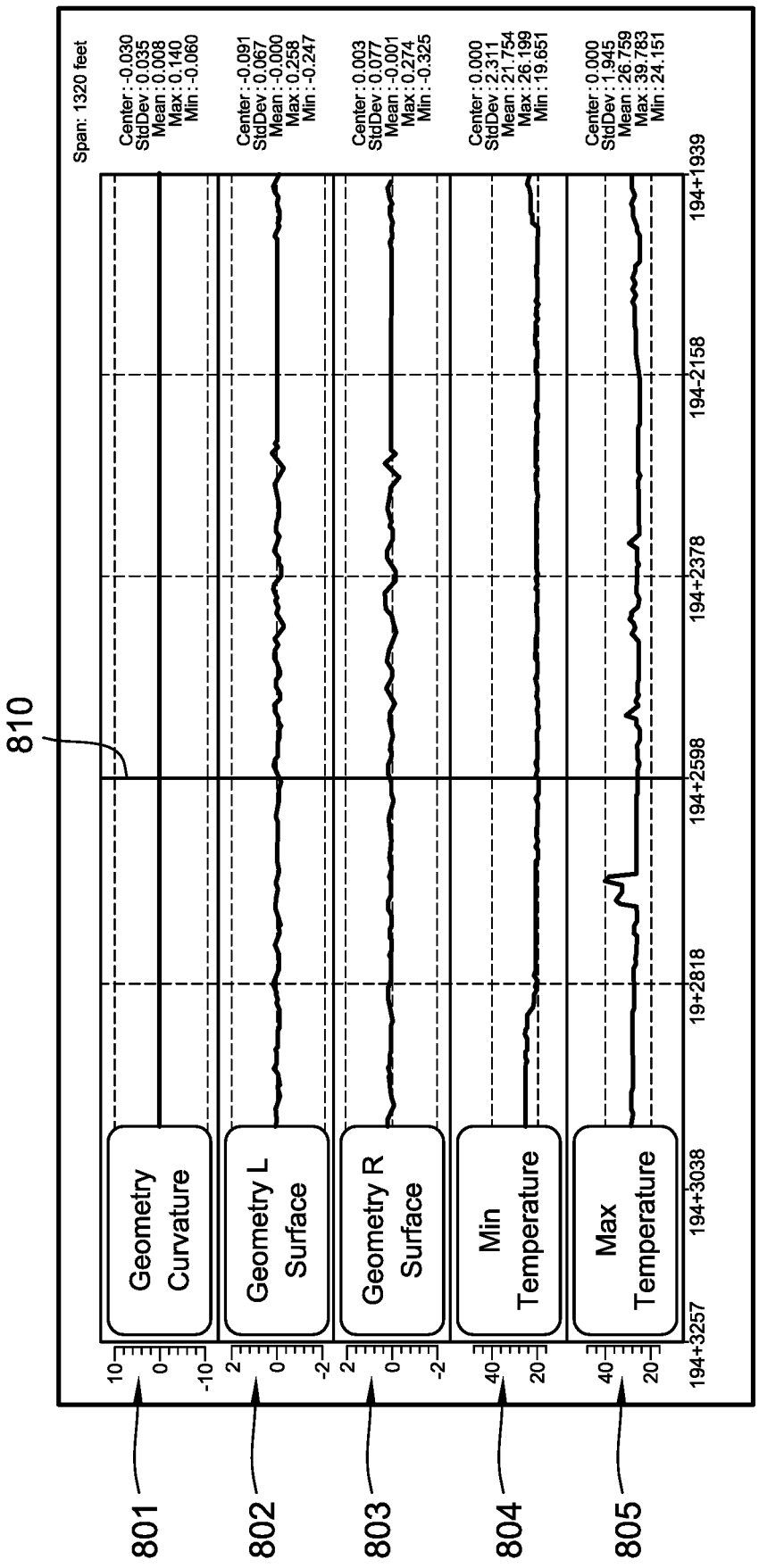
FIG. 8 illustrates a plurality of graphs indicative of temperature metrics and a plurality of graphs indicative of railroad track geometry metrics according to some implementations of the present disclosure.

Referring to FIG. 8, a plurality of graphs indicative of temperature metrics and a plurality of graphs indicative of railroad track geometry metrics for a plurality of locations along a length of a railroad are illustrated. Graph 804 is similar to graph 704 (FIG. 7) and is indicative of a minimum temperature metric for a plurality of locations along the length of the railroad. Graph 805 is similar to graph 705 (FIG. 7) and is indicative of a maximum temperature metric for a plurality of locations along the length of the railroad. Graph 801 is similar to graph 701 (FIG. 7) and is indicative of a rail curvature geometry metric for a plurality of locations along the length of the railroad. Graph 802 is indicative of a left rail surface geometry metric (e.g., for the first running rail 210 shown in FIG. 3A) and graph 803 is a right rail surface geometry metric (e.g., for the second running rail 220 shown in FIG. 3A). The rail surface geometry metrics (graphs 802 and 803) can be indicative of, for example, grinding marks on the top surface of the rails, cracks, pitting, etc. The graphs 801-805 include a visual marker 810 that is the same as, or similar to, the visual marker 710 of the graphs 701-707 (FIG. 7). As shown by FIGS. 7 and 8, any combination of graphs indicative of temperature metrics and/or railroad track geometry metrics can be simultaneously displayed using the systems and methods described herein.

In some implementations, step 506 further includes displaying one or more graphs that are indicative of one or more railroad track defect metrics. Generally, railroad track defect can include, for example, cracks, pitting, misalignment, missing track elements, grinding marks, etc. The railroad defect metrics can include, for example, a crack density metric, an average crack angle metric, an average crack width metric, a pitting density metric, a surface damage density metric, a grinding mark metric, or any combination thereof. Further, the railroad track defect metrics can include a surface region index, which is a weighted average of a plurality of different railroad track defect metrics for one location, a weighted sum of the same railroad track defect for a plurality of locations along the railroad, or a weighted sum of a plurality of different railroad track defect metrics for a plurality of locations along the railroad. The railroad track defect metrics can be determined using an inspection system coupled to the same transport device as the system 100 described herein, or a different transport device.

Advantageously, by simultaneously displaying graphs indicative of the determined temperature metrics (e.g., graphs 704-707), graphs indicative of rail geometry metrics (e.g., graphs 701-703), or graphs indicative of railroad track defect metrics, a user can correlate the determined temperature metrics with rail geometry metrics. For example, as described herein, a lower minimum temperature can be indicative of standing water on the railroad due to poor drainage (which can be confirmed by viewing a visual image of that location). Using the visual marker 710, a user can then compare a railroad geometry metric for that location and determine based on, for example, the rail cant, that the standing water is causing ground conditions to deteriorate and is causing a dip a running rail. If the user only viewed the rail cant metric, the user would not be able to determine the precise cause of the rail cant. Thus, advantageously, the user can schedule maintenance for that location and ensure that the maintenance crew has the proper expertise and equipment to address the drainage problem, making maintenance more effective and efficient than looking rail geometry metrics alone. For another example, as described herein, higher temperatures could be indicative of electrical arcing from the third power rail to a running rail. Among other undesirable effects, electrical arcing could cause electrolytic corrosion of the running rail, which can cause pitting, cracking, etc. Thus, a user can identify a potential cause of the railroad track defect that would not be readily apparent without the determined temperature metrics. And, instead of scheduling a maintenance crew to merely replace a section of the running rail, the user can ensure that the maintenance crew also has the expertise and equipment to repair the third power rail and prevent electrical arcing, making repairs more effective, efficient, and longer lasting.

Referring back to FIG. 5, step 507 of the method 500 includes obtaining, using a camera (e.g., a camera that is the same as, or similar to, the camera 116 of the system 100 (FIG. 2)), visual image data reproducible as one or more visual images of a portion of the railroad. The visual image data is associated with the current location of the transport device in the same, or similar, manner as the thermal image data is associated with the current location of the transport device during step 502. As described herein, the visual image data is associated with the same portion of the railroad as the thermal image data obtained during step 501. In some implementations, step 507 also includes identifying one or more region of interest within the visual image that is the same as the region(s) of interest identified in the corresponding thermal image during step 503.

Step 508 of the method 500 includes overlaying the determined temperature metric(s) from the thermal image data as text on the visual image. For example, the maximum temperature is overlaid on the location in the visual image where the maximum temperature was detected in the thermal image, the minimum temperature is overlaid on the location in the visual image where the minimum temperature was detected in the thermal image, and the average temperature from the thermal image is overlaid at any suitable location on the visual image. This overlaying aids a human user in identifying a potential cause of an abnormal temperature metric, where it may be difficult to see the railroad track components in the thermal image. Additionally or alternatively, a portion of the thermal image itself can be overlaid on the visual image. For example, the identified region of interest within the thermal image (step 503) can be cropped from the thermal image and overlaid on the visual image.

Step 509 of the method 500 includes comparing one or more of the determined temperature metric(s) to a predefined temperature threshold. Step 510 of the method 500 includes generating an alert in response to the comparison between the determined temperature metric(s) and the predefined temperature threshold. The alert generated during step 510 can be displayed on a display device or transmitted to a third party or location, or both. Further, the alert generated during step 510 can contain text, images (e.g., a thermal image, a visual image, or both), and location data.

As described herein, high temperatures on a portion of the railroad can be indicative of power leakage, electrical shorting, and/or electric arcing (e.g., from the third power rail 230, an overhead power line, etc.). Accordingly, in some implementations, the determined maximum temperature metric is compared to a predefined temperature threshold that is greater than about 30° C., greater than about 50° C., greater than about 100° C., greater than about 200° C., etc. Responsive to the determined maximum temperature metric being equal to or greater than the predefined temperature threshold, step 510 of the method 500 includes generating an alert indicative of a potential electrical defect in the railroad. Alternatively, in some implementations, the determined maximum temperature metric can be compared to the ambient temperature (as determined, for example, by the thermal sensor 28). Responsive to the determined maximum temperature metric being a predefined percentage greater than the ambient temperature (e.g., more than 5% greater than the ambient temperature, more than 10% greater than the ambient temperature, more than 50% greater than the ambient temperature, more than 100% greater than the ambient temperature, more than 300% greater than the ambient temperature, etc.), step 510 includes generating an alert indicative of a potential electrical defect in the railroad. Alternatively still, in some implementations, the determined maximum temperature metric can be compared to the determined average temperature metric. Responsive to the determined maximum temperature metric being a predefined percentage greater than the determined average temperature metric (e.g., more than 5% greater than the ambient temperature, more than 10% greater than the ambient temperature, more than 50% greater than the ambient temperature, more than 100% greater than the ambient temperature, more than 300% greater than the ambient temperature, etc.), step 510 includes generating an alert indicative of a potential electrical defect in the railroad.

As described herein, lower temperatures along the railroad can be indicative of standing or pooling water due to, for example, leakage or seepage of water from a tunnel and/or poor drainage of the track bed (e.g., due to an obstruction of a drain, a grade, pitch, or slope of the railroad, etc.). Accordingly, in some implementations, the determined minimum temperature metric is compared to a predefined temperature threshold that is less than about 20° C., less than about 18° C., less than about 16° C., less than about 14° C., less than about 10° C., etc. Responsive to the determined minimum temperature metric being equal to or less than the predefined temperature threshold, step 510 of the method 500 includes generating an alert indicative of potential standing water on the railroad. Alternatively, in some implementations, the determined minimum temperature metric can be compared to the ambient temperature (as determined, for example, by the thermal sensor 28). Responsive to the determined minimum temperature metric being a predefined percentage less than the ambient temperature (e.g., more than 2% less than the ambient temperature, more than 5% less than the ambient temperature, more than 7% less than the ambient temperature, more than 10% less than the ambient temperature, more than 20% less than the ambient temperature, etc.), step 510 includes generating an alert indicative of potential standing water on the railroad. Alternatively still, in some implementations, the determined minimum temperature metric can be compared to the determined average temperature metric. Responsive to the determined minimum temperature metric being a predefined percentage les than the determined average temperature metric (e.g., more than 2% less than the ambient temperature, more than 5% less than the ambient temperature, more than 7% less than the ambient temperature, more than 10% less than the ambient temperature, more than 20% less than the ambient temperature, etc.), step 510 includes generating an alert indicative of potential standing water on the railroad.

As described herein, in some implementations, the portion of the railroad within the thermal image data includes a tunnel wall or ceiling (e.g., walls 244 and/or ceiling 246 of tunnel 240 (FIGS. 3 and 4)). And, in some implementations, the region of interest (step 503) can include the walls and/or ceiling of the tunnel (e.g., at the exclusion of a portion or all of the running rails and power rail). Water may leak or seep through the tunnel walls and ceiling from, for example, groundwater, a water main or sewer break, or a body of water under which the tunnel spans. In some cases, slow seepage or leakage through small cracks may be not readily perceivable to the human eye, even if there is pooling water. Thus, advantageously, the determined temperature metrics of the tunnel walls and ceiling can be compared to one or more predefined temperature thresholds to trigger an alert (step 510). For example, if the region of interest is selected to only include at least a portion of the walls and ceiling of the tunnel, the minimum temperature metric can be compared to a predefined temperature threshold, including, for example, the ambient temperature and/or the determined average temperature metric. Responsive to the alert (step 510), a user can view the thermal image for that location and visually identify leaks/cracks based on the colors within the thermal image.

In some implementations, step 509 can include comparing the determined temperature standard deviation metric to a predefined threshold and generating an alert during step 510 responsive to the temperature standard deviation metric being greater than a predefined threshold (e.g., 1° C., 2° C., 3° C., 5° C., 10° C., 15° C., etc.). A large standard deviation indicates that the temperatures of the portion of the railroad within the thermal image are spread out over a wider range of values than a lower standard deviation. The relevance of a large standard deviation can be even greater in implementations including optional step 503, where the region of interest is smaller than the entire thermal image. A wider temperature range within a smaller image is likely to be more indicative of a defect/condition than if the same temperature range were found for a larger image. Accordingly, in implementations including the optional step 503, the predefined threshold can be set lower than implementations not including the optional step 503, which may reduce the number of false alerts generated during step 510.

Step 511 is similar to step 508 and includes overlaying a visual indicator of the area of the portion of the railroad that generated the alert during step 510 on the visual image of the portion of the railroad obtained during step 507. The visual indicator allows a user to immediately identify the area of the railroad containing a potential defect/condition and can then readily confirm the presence or absence of a defect/condition requiring corrective action. The visual indicator can be any shape, such as, for example, a circle, a square, a triangle, a star, a polygon, etc. that calls attention to the area of interest. Moreover, the temperature metric(s) that generated the alert during step 510 (or all of the determined temperature metrics) can also be overlaid on the visual image in the same or similar manner described herein with respect to step 508.

The railroads described herein can include a rail switch (e.g., a single slip switch, a double slip switch, an outside slip switch, a crossover switch, a stub switch, a plate switch, an interlaced turnout, a wye switch, etc.) which is a mechanical device that permits a transport device to move from a first set of rails to a second, adjacent set of rails. Often, in cold conditions (e.g., when the ambient temperature is at about 0° C. or lower), snow and ice can interfere with the proper operation of the rail switch. Thus, rail switches often include a heater (e.g., gas or electric) or anti-freeze chemicals to maintain normal operation during cold conditions. However, it may be difficult to visually determine whether the heater and/or antifreeze is adequate and it may not be until a rail switch failure that the railroad identified a defect in the heater or application of antifreeze.

Advantageously, the systems and methods described herein can be used to determine whether the heater(s) and/or anti-freeze chemicals are sufficiently de-icing a rail switch. For example, spikes in a graph indicative of determined maximum temperature metrics or determined average temperature metrics (e.g., graphs 705 or 706 of FIG. 7) along the railroad can be indicative of locations where a rail switch that is properly heated is present during cold conditions (e.g., when the ambient temperatures is at about 0° C. or lower). Thus, a user can identify the location(s) of a rail switch on the x-axis of the graph(s) (e.g., using a lookup table or railroad map) and evaluate the determined temperature metrics at that location to determine whether the rail switch heater/antifreeze is effective. For example, if there is a spike in the determined maximum temperature metric at a first location where there is a first rail switch compared to adjacent locations on the x-axis, and there is no spike in the determined maximum temperature metric at a second location where there is a second rail switch, this can be indicative of a rail switch heater failure. Alternatively, one or more determined temperature metrics at locations of heated rail switches can be compared to a predefined temperature threshold (e.g., a temperature that is greater than about 5° C., greater than about 10° C., greater than about 20° C., etc.) to determine whether the rail switch heater is functioning properly, or not properly (e.g., by comparing to a predefined temperature threshold that is less than about 5° C., less than 0° C., etc). The comparisons described herein can be done manually by a user, or automatically using the processor(s) of the system. Moreover, the system can generate an alert that is displayed on a display device or transmitted to a remote device/location responsive to determining that a rail switch heater/antifreeze is not functioning properly.

According to some implementations, an alternative method for analyzing thermal properties of a railroad includes analyzing the thermal image data (e.g., obtained using the thermal imaging devices described herein) to determine a temperature metric along the length of the railroad. The temperature metric can include a plurality of temperature, including the various temperature metrics described herein. Similar to the step 509 of the method 500 (FIG. 5), the alternative method includes comparing the determined temperature metric along the length of the railroad to a predefined temperature threshold indicative of a railroad condition. The railroad condition can be, for example, standing or pooling water (e.g., due to water seepage in a tunnel, poor track bed drainage, an obstructed drain box, etc.). The predefined temperature threshold can be, for example, a temperature that is at least about 2%, 5%, 10%, 20%, etc. lower than an ambient temperature (e.g., which can be obtained using a temperature sensor). Alternatively, the predefined temperature threshold can be a temperature that is at least about 2%, 5%, 10%, 20%, etc. lower than a determined average temperature metric along the length of the railroad. Responsive to the determined temperature metric at a location along the length of the railroad being less than the predefined temperature threshold, the alternative method further includes analyzing one or more railroad track geometry metrics associated with the location along the length of the railroad to identify the presence or absence of a railroad track defect. The one or more railroad track geometry metrics can include any of the railroad track geometry metrics described herein, including, for example, a rant cant, a rail cross-level, or both. The railroad track defect can be, for example, a rail cross-level that is greater than about 0.5 inches, greater than about 1 inch, greater than about 2 inches, greater than about 3 inches, etc. Alternatively, the railroad track defect can be, for example, a rail cant that is greater than about 5 degrees, greater than about 10 degrees, greater than about 20 degrees, etc. Responsive to identifying the presence of a railroad track defect at the location, the alternative method further includes generating a report identifying the railroad condition at the location as the cause of the railroad track defect at the location. In the case where the railroad condition is standing or pooling water, the water can cause the ground or track bed underneath one or more of the rails to be depressed such that, for example, a first running rail is lower or higher than a second running rail. Accordingly, the report indicatives that a rant cant or rail cross-level that is considered defective is caused by the standing/pooling water, providing more insight to a user than the railroad track geometry metrics or the thermal image data alone. The report can include a visual image of the location along the railroad, a thermal image of the location along the railroad, a graph indicative of the determined temperature metric, a graph indicative of the railroad track geometry metric, or any combination thereof. The alternative method can further include transmitting the report to a remote device or location and/or displaying the report on a display device.

While the present disclosure has been described with reference to one or more particular embodiments or implementations, those skilled in the art will recognize that many changes may be made thereto without departing from the spirit and scope of the present disclosure. Each of these embodiments or implementations and obvious variations thereof is contemplated as falling within the spirit and scope of the present disclosure. It is also contemplated that additional embodiments implementations according to aspects of the present disclosure may combine any number of features from any of the embodiments described herein.

Alternative Implementations

Implementation 1. A system for analyzing thermal properties of a railroad, the system comprising: a thermal imaging device configured to generate thermal image data reproducible as a thermal image of a portion of the railroad; an electronic display device; a memory device configured to receive and store therein the generated thermal image data; and one or more processors configured to: analyze the thermal image data to determine a temperature metric of the portion of the railroad; and cause the electronic display device to display a graph indicative of the temperature metric of the portion of the railroad.

Implementation 2. The system according to implementation 1, wherein the temperature metric of the portion of the railroad includes a plurality of temperature metrics.

Implementation 3. The system according to implementation 2, wherein the plurality of temperature metrics of the portion of the railroad includes a maximum temperature, a minimum temperature, an average temperature, a standard deviation of temperature, or any combination thereof.

Implementation 4. The system according to any one of implementations 1-3, wherein at least one of the one or more processors is configured to associate the determined temperature metric of the portion of the railroad with a location of the portion of the railroad.

Implementation 5. The system according to implementation 4, further comprising a GPS sensor configured to determine the location of the portion of the railroad.

Implementation 6. The system according to any one of implementations 1-5, wherein the railroad includes a first running rail, a second running rail, a third power rail, a crosstie, a fastener, a joint-bar, ballast, an overhead power line, a tunnel wall, a tunnel ceiling, a switch, or any combination thereof.

Implementation 7. The system according to implementation 6, wherein at least one of the one or more processors is configured to identify a region of interest within the thermal image of the railroad.

Implementation 8. The system according to implementation 7, wherein the region of interest includes at least a portion of the first running rail, the second running rail, the third power rail, the crosstie, the fastener, the joint-bar, ballast, the overhead power line, the tunnel wall, the tunnel ceiling, or any combination thereof.

Implementation 9. The system according to any one of implementations 1-8, further comprising a communication module configured to transmit the thermal image data, the determined temperature metric of the portion of the railroad, the graph indicative of the temperature metric, or any combination thereof to a remote device.

Implementation 10. The system according to implementation 9, wherein at least one of the one or more processors is configured to associate the temperature metric of the portion of the railroad track with a railroad track metric stored in the memory device that is associated with the location of the portion of the railroad track.

Implementation 11. The system according to implementation 10, wherein the railroad track metric associated with the location of the portion of the railroad track includes a plurality of railroad track geometry metrics.

Implementation 12. The system according to implementation 11, wherein the plurality of railroad track geometry metrics includes a rail cross-level, a rail curvature, a rail gauge, a rail cant, or any combination thereof.

Implementation 13. The system according to implementation 10, wherein at least one of the one or more processors is configured to cause the electronic display device to display a graph indicative of the railroad track metric associated with the location of the portion of the railroad simultaneously with the graph indicative of the temperature metric of the portion of the railroad.

Implementation 14. The system according to any one of implementations 1-13, further comprising a camera configured to generate image data reproducible as an image of a second portion of the railroad.

Implementation 15. The system according to implementation 14, wherein an image plane of the thermal imaging device is aimed at the portion of the railroad and an image plane of the camera is aimed at the second portion of the railroad.

Implementation 16. The system according to implementation 15, wherein the image plane of the thermal imaging device is coincident with the image plane of the camera such that the portion of the railroad is the same as the second portion of the railroad.

Implementation 17. The system according to implementation 14 or 15, wherein a field of view of the thermal imaging device and a field of view of the camera substantially overlap.

Implementation 18. The system according to any one of implementations 14-16, wherein a wavelength of light captured by the thermal imaging device is between about 9 micrometers and about 14 micrometers and a wavelength of light captured by the camera is between about 400 nanometers and about 700 nanometers.

Implementation 19. The system according to any one of implementations 1-18, wherein at least one of the one or more processors is configured to compare the determined temperature metric to a predefined temperature threshold stored in the memory device.

Implementation 20. The system according to implementation 19, wherein responsive to determining that the temperature metric is greater than the predefined temperature threshold, the one or more processors cause the electronic display device to display an alert.

Implementation 21. The system according to implementation 19, further comprising a communication module, wherein responsive to determining that the temperature metric is greater than the predefined temperature threshold, the one or more processors cause (i) the electronic display device to display an alert, (ii) the communication module to transmit an alert to a remote device, or (iii) both (i) and (ii).

Implementation 22. The system according to any one of implementations 19-21, wherein responsive to determining that the temperature metric is less than the predefined temperature threshold, the one or more processors cause the electronic display device to display an alert.

Implementation 23. The system according to any one of implementations 19-22, further comprising a camera configured to generate image data reproducible as an image of the portion of the railroad and wherein responsive to determining that the temperature metric is greater than the predefined temperature threshold, at least one of the one or more processors is configured to overlay a numerical value indicative of the determined temperature metric on the image of the portion of the railroad.

Implementation 24. The system according to implementation 23, further comprising a communication module configured to transmit the image and overlaid numerical value to a remote device.

Implementation 25. The system of according to implementation 23 or 24, wherein at least one of the one or more processors is configured to cause the electronic display device to display the image and overlaid numerical value.

Implementation 26. The system according to any one of implementations 19-25, further comprising a communication module, wherein responsive to determining that the temperature metric is less than the predefined temperature threshold, the one or more processors cause (i) the electronic display device to display an alert, (ii) the communication module to transmit an alert to a remote device, or (iii) both (i) and (ii).

Implementation 27. The system according to any one of implementations 19-26, wherein the predefined temperature threshold is indicative of an electrical defect on the portion of the railroad.

Implementation 28. The system according to any one of implementations 19-27, wherein the predefined temperature threshold is indicative of the presence of water on or adjacent to the portion of the railroad.

Implementation 29. The system according to any one of implementations 19-29, wherein the predefined temperature threshold is an ambient temperature.

Implementation 30. The system according to implementation 29, wherein responsive to determining that the temperature metric is a predefined percentage greater than the ambient temperature, the one or more processors cause (i) the electronic display device to display an alert, (ii) a communication module to transmit an alert to a remote device, or (iii) both (i) and (ii).

Implementation 31. The system according to implementation 30, wherein the predefined percentage is greater than 10 percent.

Implementation 32. The system according to implementation 29, wherein responsive to determining that the temperature metric is a predefined percentage less than the ambient temperature, the one or more processors cause (i) the electronic display device to display an alert, (ii) a communication module to transmit an alert to a remote device, or (iii) both (i) and (ii).

Implementation 33. The system according to implementation 32, wherein the predefined percentage is greater than 10 percent.

Implementation 34. The system according to any one of implementations 29-33, further comprising a temperature sensor for determining the ambient temperature.

Implementation 35. The system according to any one of implementations 1-34, further comprising a transport device configured to move along the railroad.

Implementation 36. The system according to implementation 35, wherein the thermal imaging device, the memory device, and the one or more processors are coupled to the transport device.

Implementation 37. The system according to implementation 36, wherein the electronic display device is coupled to the transport device.

Implementation 38. A system for analyzing thermal properties of a railroad, the system comprising: a thermal imaging device configured to generate thermal image data reproducible as a thermal image of a portion of the railroad; a communication module; a memory device configured to receive and store therein the generated thermal image data; and one or more processors configured to: analyze the thermal image data to determine a temperature metric of the portion of the railroad; and cause the communication module to transmit a graph indicative of the temperature metric of the portion of the railroad to a remote device.

Implementation 39. A system for visualizing and analyzing thermal properties of a railroad, the system comprising: a transport device configured to move along the railroad; a thermal imaging device coupled to the transport device and being configured to generate thermal image data reproducible as a thermal image of a portion of the railroad; an electronic display device; a GPS sensor coupled to the transport device for determining a location of the transport device; a communication module coupled to the transport device; a memory device configured to receive and store therein the generated thermal image data; and one or more processors configured to: analyze the thermal image data to determine a temperature metric of the portion of the railroad; and cause (i) the electronic display device to display a graph indicative of the temperature metric of the portion of the railroad, (ii) the communication module to transmit a graph indicative of the temperature metric of the portion of the railroad to a remote device, or (iii) both (i) and (ii).

Implementation 40. The system according to implementation 39, wherein the memory device and the one or more processors are coupled to the transport device.

Implementation 41. The system according to implementation 40, wherein the electronic display device is coupled to the transport device.

Implementation 42. The system according to any one of implementations 39-40, further comprising a camera configured to generate image data reproducible as one or more images of the portion of the railroad.

Implementation 43. A method for analyzing thermal properties of a railroad, the method comprising: obtaining, using a thermal imaging device, (i) first thermal image data reproducible as a first thermal image of a first portion of the railroad and (ii) second thermal image data reproducible as a second thermal image of a second portion of the railroad; analyzing the first thermal image data to determine a temperature metric of the first section of the railroad; analyzing the second thermal image data to determine a temperature metric of the second section of the railroad; and generating a graph indicative of the determined temperature metric of the first section and the second section of the railroad.

Implementation 44. The method according to implementation 43, further comprising causing an electronic display device to display the graph indicative of the determined temperature metric of the first section and the second section of the railroad.

Implementation 45. The method according to implementation 44, further comprising associating (i) the determined temperature metric of the first section of the railroad location data for the first section of the railroad and (ii) the determined temperature metric of the second portion of the railroad with location data for the second portion of the railroad.

Implementation 46. The method according to implementation 45, further comprising displaying the graph indicative of the determined temperature metric of the first section and the second section of the railroad and a graph indicative of a railroad track metric associated with the first section and the second section of the railroad.

Implementation 47. The method according to implementation 43, wherein the railroad track metric associated with the first section and the second section of the railroad includes a plurality of railroad track geometry metrics.

Implementation 48. The method according to implementation 47, wherein the plurality of railroad track geometry metrics includes a rail cross-level, a rail curvature, a rail gauge, a rail cant, or any combination thereof.

Implementation 49. The method according to implementation 48, wherein the temperature metric of the first section and the second section of the railroad includes a plurality of temperature metrics.

Implementation 50. The method according to implementation 47, wherein the plurality of temperature metrics includes a maximum temperature, a minimum temperature, an average temperature, a standard deviation of temperature, or any combination thereof.

Implementation 51. The method according to implementation 50, further comprising displaying a first graph indicative of the maximum temperature for the first and second sections of the railroad, a second graph indicative of the minimum temperature for the first and second sections of the railroad, a third graph indicative of the average temperature of the first and second sections of the railroad, and a fourth graph indicative of the standard deviation of temperature for the first and second sections of the railroad.

Implementation 52. The method according to implementation 51, further comprising displaying a fifth graph indicative of the rail cross-level for the first and second sections of the railroad, a sixth graph indicative of the rail curvature for the first and second sections of the railroad, and seventh graph indicative of the rail gauge for the first and second sections of the railroad.

Implementation 53. The method according to implementation 43, wherein the railroad includes a first running rail, a second running rail, a third power rail, a crosstie, a fastener, a joint-bar, ballast, an overhead power line, a tunnel wall, a tunnel ceiling, a switch, or any combination thereof.

Implementation 54. The method according to implementation 53, further comprising, prior to the analyzing, identifying a region of interest within the thermal image of the first section of railroad.

Implementation 55. The method according to implementation 54, wherein the region of interest within the thermal image of the first section of the railroad includes at least a portion of the first running rail, the second running rail, the third power rail, the crosstie, the fastener, the joint-bar, ballast, the overhead power line, or any combination thereof.

Implementation 56. The method according to implementation 54, further comprising, prior to the analyzing, identifying a region of interest within the thermal image of the second section of the railroad.

Implementation 57. The method according to implementation 56, wherein the region of interest within the thermal image of the section of the railroad includes at least a portion of the first running rail, the second running rail, the third power rail, the crosstie, the fastener, the joint-bar, ballast, the overhead power line, or any combination thereof.

Implementation 58. The method according to implementation 57, wherein the determined temperature metric of the first section of the railroad is within the identified region of interest and the determined temperature metric of the second section of the railroad is within the identified region of interest.

Implementation 59. The method according to implementation 58, further comprising obtaining an image of the first portion of the railroad.

Implementation 60. The method of claim 59, further comprising (i) displaying the image of the first portion of the railroad and (ii) overlaying a numerical value associated with the determined temperature metric of the first portion of the railroad within the identified region of interest on the image of the first portion of the railroad.

Implementation 61. The method according to implementation 43, further comprising comparing the determined temperature metric for the first section of the railroad to a predefined temperature threshold.

Implementation 62. The method according to implementation 61, further comprising, responsive to determining that the temperature metric for the first section of the railroad is greater than the predefined temperature threshold, (i) displaying an alert, (ii) transmitting an alert to a third party, or (iii) both (i) and (ii).

Implementation 63. The method according to implementation 61, further comprising, responsive to determining that the temperature metric for the first section of the railroad is less than the predefined temperature threshold, (i) displaying an alert, (ii) transmitting an alert to a third party, or (iii) both (i) and (ii).

Implementation 64. The method according to implementation 63, wherein the predefined temperature threshold is indicative of an electrical defect within the first portion of the railroad.

Implementation 65. The method according to implementation 63, wherein the predefined temperature threshold is indicative of the presence of water on or adjacent to the first portion of the railroad.

Implementation 66. The method according to implementation 61, wherein the predefined temperature threshold is an ambient temperature.

Implementation 67. A method for analyzing thermal properties of a railroad, the method comprising: obtaining, using a thermal imaging device, first thermal image data reproducible as one or more thermal images of a plurality of sections of the railroad; analyzing the thermal image data to determine a temperature metric in the thermal image of each of the plurality of sections of the railroad; and displaying a graph indicative of the determined temperature metric for each of the plurality of sections of the railroad.

Implementation 68. The method of claim 67, wherein the temperature metric includes a maximum temperature, a minimum temperature, an average temperature, a standard deviation of temperature, or any combination thereof.

Implementation 69. The method according to implementation 68, wherein the graph indicative of the determined temperature metric for each of the plurality of sections of the railroad includes a plurality of graphs.

Implementation 70. The method according to implementation 69, wherein the plurality of graphs includes a first graph indicative of the maximum temperature for each of the plurality of sections of the railroad, a second graph indicative of the minimum temperature for each of the plurality of sections of the railroad, a third graph indicative of the average temperature for each of the plurality of sections of the railroad, and a fourth graph indicative of the temperature standard deviation for each of the plurality of sections of the railroad.

Implementation 71. The method according to implementation 67, further comprising displaying a graph indicative of a railroad track geometry metric for each of the plurality of sections of the railroad simultaneously with the graph indicative of the determined temperature metric for each of the plurality of sections of the railroad.

Implementation 72. The method according to implementation 71, wherein the railroad track geometry metric includes a rail cross-level, a rail curvature, a rail gauge, a rail cant, or any combination thereof.

Implementation 73. The method according to implementation 72, wherein the graph indicative of the railroad track geometry metric includes a plurality of graphs and the graph indicative of the determined temperature metric includes a plurality of graphs, Implementation 74. The method according to implementation 73, wherein (i) the plurality of graphs indicative of the determined temperature metric includes a first graph indicative of the maximum temperature for each of the plurality of sections of the railroad, a second graph indicative of the minimum temperature for each of the plurality of sections of the railroad, a third graph indicative of the average temperature for each of the plurality of sections of the railroad, and a fourth graph indicative of the temperature standard deviation for each of the plurality of sections of the railroad and (ii) the plurality of graphs indicative of the railroad track geometry metric includes a fifth graph indicative of the rail cross-level for each of the plurality of sections of the railroad, a sixth graph indicative of the rail curvature for each of the plurality of sections of the railroad, and a seventh graph indicative of the rail gauge for each of the plurality of sections of the railroad.

Implementation 75. The method according to implementation 67, wherein the graph includes an x-axis indicative of a location of each of the plurality of sections of the railroad and a y-axis indicative of the determined temperature metric.

Implementation 76. The method of implementation 75, wherein the graph includes a plurality of data points.

Implementation 77. The method according to implementation 76, further comprising displaying a maximum value, a minimum value, an average value, a standard deviation, or any combination thereof, associated with the plurality of data points of the graph.

Implementation 78. A method for analyzing thermal properties of a railroad, the method comprising: obtaining, using a thermal imaging device, thermal image data reproducible as one or more thermal images along a length of the railroad; analyzing the thermal image data to determine a temperature metric along the length of the railroad; comparing the determined the temperature metric along the length of the railroad to a predefined temperature threshold indicative of a railroad condition; responsive to the determined temperature metric at a location along the length of the railroad being less than the predefined temperature threshold, analyzing one or more railroad track geometry metrics associated with the location along the length of the railroad to identify the presence or absence of a railroad track defect; and responsive to identifying the presence of a railroad track defect at the location, generating a report identifying the railroad condition at the location as the cause of the railroad track defect at the location.

Implementation 79. The method according to implementation 78, wherein the railroad condition is standing or pooling water.

Implementation 80. The method according to implementation 78, wherein the one or more railroad track geometry metrics includes a rail cross-level, a rail cant, or both.

Implementation 81. The method according to implementation 80, wherein the railroad track defect is a rail cross-level that is greater than about 1 inch.

Implementation 82. The method according to implementation 78, wherein the railroad track defect is a rail cant that is greater than about 10 degrees.

Implementation 83. The method according to implementation 78, further comprising transmitting the generated report to a remote device.

Implementation 84. The method according to implementation 78, further comprising displaying the generated report on a display device.

Implementation 85. The method according to implementation 78, wherein the temperature metric is a minimum temperature metric.

Implementation 86. The method according to implementation 78, further comprising determining an ambient temperature along the length of the railroad.

Implementation 87. The method according to implementation 86, wherein the predefined temperature threshold is a temperature that is at least 5% lower than the determined ambient temperature.

Implementation 88. The method according to implementation 87, wherein the railroad condition is standing or pooling water.

Implementation 89. The method according to implementation 78, wherein the determined temperature metrics includes a minimum temperature metric and an average temperature metric.

Implementation 90. The method according to implementation 89, wherein the predefined temperature threshold is a temperature is that at least 5% lower than the average temperature metric.

It is contemplated that any element or any portion thereof from any of implementations 1-90 above can be combined with any other element or elements or portion(s) thereof from any of the other implementations 1-90 to form an implementation of the present disclosure.

What is claimed is:

1. A system for analyzing thermal properties of a railroad, the system comprising:
 a thermal imaging device configured to generate thermal image data reproducible as one or more thermal images along a length of the railroad;
 a memory device configured to receive and store therein the generated thermal image data; and
 one or more processors configured to:
  analyze the thermal image data to determine a temperature metric along the length of the railroad;
  compare the temperature metric along the length of the railroad to a predefined temperature threshold indicative of a railroad condition;
  responsive to the temperature metric at a location along the length of the railroad being less than the predefined temperature threshold, analyze one or more railroad track geometry metrics associated with the location along the length of the railroad to identify a presence or absence of a railroad track defect; and
  responsive to the presence of a railroad defect being identified at the location along the length of the railroad, generate a report identifying the railroad condition at the location along the length of the railroad as the cause of the railroad track defect at the location along the length of the railroad.

2. The system of claim 1, wherein the temperature metric along the length of the railroad is a maximum temperature, a minimum temperature, an average temperature, a standard deviation of temperature, a temperature spike, or any combination thereof.

3. The system of claim 1, wherein the railroad track defect is one or more of a rail-cross level that is great than about 1 inch and a rail cant that is greater than about 10 degrees.

4. The system of claim 1, wherein at least one of the one or more processors is configured to (i) identify a region of interest along the length of the railroad within the one or more thermal images along the length of the railroad and (ii) determine the temperature metric within the region of interest.

5. The system of claim 4, wherein the region of interest includes at least a portion of a first running rail, a second running rail, a third power rail, a crosstie, a fastener, a joint-bar, ballast, an overhead support line, an overhead catenary, an overhead power line, a tunnel wall, a tunnel ceiling, an electrical cable, an electrical conduit, a switch, or any combination thereof.

6. The system of claim 1, further comprising a communication module configured to transmit the thermal image data, the determined temperature metric along the length of the railroad, an indication of the railroad track defect, the report, or any combination thereof to a remote device.

7. The system of claim 1, wherein the railroad track geometry metric is a rail cross-level, a rail curvature, a rail gauge, a rail cant, or any combination thereof.

8. The system of claim 1, wherein the predefined temperature threshold is a temperature that is at least 5% lower than an ambient temperature.

9. The system of claim 1, wherein the railroad track defect is standing water, water seepage, electrical arcing, overheating, power leakage, or any combination thereof.

10. The system of claim 1, wherein the one or more processors cause an electronic display device to display an alert responsive to identifying the railroad track defect.

11. The system of claim 1, further comprising a communication module, wherein responsive to identifying the railroad track defect, the one or more processors cause the communication module to transmit an alert to a remote device.

12. The system of claim 10, further comprising a camera configured to generate image data reproducible as an image along the length of the railroad and wherein at least one of the one or more processors is configured to display the image along the length of the railroad on the electronic display device.

13. The system of claim 12, wherein at least one of the one or more processors is configured to cause a numerical value indicative of the determined temperature metric to be overlaid on the image along the length of the railroad.

14. The system of claim 12, wherein a wavelength of light captured by the thermal imaging device is between about 9 micrometers and about 14 micrometers and a wavelength of light captured by the camera is between about 400 nanometers and about 700 nanometers.

15. A system for analyzing thermal properties of a railroad, the system comprising:
a thermal imaging device configured to generate thermal image data reproducible as a thermal image of a portion of the railroad;
a camera configured to generate image data reproducible as an image of the portion of the railroad;
a GPS sensor configured to determine a location of the system relative to the portion of the railroad;
an electronic display device;
a memory device configured to receive and store therein the generated thermal image data and the image data; and
one or more processors configured to:
determine a temperature metric of the portion of the railroad based at least in part on the thermal image data;
determine, based on the temperature metric of the portion of the railroad and a predefined temperature threshold, a railroad condition for the portion of the railroad;
identify, based on the railroad condition and one or more railroad track geometry metrics, a defect in the portion of the railroad; and
responsive to the identification of the railroad defect in the portion of the railroad, generate a report identifying the railroad condition as the cause of the railroad track defect in the portion of the railroad.

16. The system of claim 15, wherein the railroad defect is one or more of a rail-cross level that is great than about 1 inch and a rail cant that is greater than about 10 degrees.

17. The system of claim 15, further comprising:
a communication module configured to transmit the thermal image data, the determined temperature metric, an indication of the railroad track defect, the report, or any combination thereof to a remote device.

18. The system of claim 15, further comprising:
a camera configured to generate image data reproducible as an image of the portion of the railroad and wherein at least one of the one or more processors is configured to display the image of the portion of the railroad on an electronic display device.

19. The system of claim 15, wherein the railroad defect includes standing water, water seepage, electrical arcing, overheating, power leakage, or any combination thereof.

20. The system of claim 18, wherein at least one of the one or more processors is configured to cause a numerical value indicative of the temperature metric to be overlaid on the image of the portion of the railroad.

* * * * *